(12) United States Patent
Wormser et al.

(10) Patent No.: US 11,084,721 B2
(45) Date of Patent: Aug. 10, 2021

(54) METHOD AND APPARATUS FOR ADIABATIC CALCIUM LOOPING

(71) Applicant: Wormser Energy Solutions, Inc., Marblehead, MA (US)

(72) Inventors: Alex Wormser, Marblehead, MA (US); John Parkes, Los Altos, CA (US); Douglas M. Todd, Galway, NY (US)

(73) Assignee: Wormser Energy Solutions, Inc., Marblehead, MA (US)

( * ) Notice: Subject to any disclaimer, the term of this patent is extended or adjusted under 35 U.S.C. 154(b) by 0 days.

(21) Appl. No.: 15/286,514

(22) Filed: Oct. 5, 2016

(65) Prior Publication Data

US 2017/0096335 A1    Apr. 6, 2017

Related U.S. Application Data

(60) Provisional application No. 62/237,709, filed on Oct. 6, 2015.

(51) Int. Cl.
*C01B 3/48* (2006.01)
*C01B 3/34* (2006.01)
(Continued)

(52) U.S. Cl.
CPC .............. *C01B 3/48* (2013.01); *B01D 53/047* (2013.01); *B01D 53/0438* (2013.01);
(Continued)

(58) Field of Classification Search
CPC ........ Y02P 20/152; Y02P 20/13; Y02C 10/08; Y02E 20/16; Y02E 20/18;
(Continued)

(56) References Cited

U.S. PATENT DOCUMENTS

| 3,373,562 A | 3/1968 | Wormser |
| 4,003,691 A | 1/1977 | Wormser |

(Continued)

FOREIGN PATENT DOCUMENTS

| CA | 2740315 A1 | 4/2010 |
| CN | 1795257 A | 6/2006 |

(Continued)

OTHER PUBLICATIONS

"Notification of Transmittal of the International Search Report and the Written Opinion of the International Searching Authority, or the Declaration" for International Patent Application No. PCT/US2016/045268, dated Nov. 10, 2016, 9 pages, International Searching Authority/KR, Korean Intellectual Property Office, Daejeon, Republic of Korea.

(Continued)

*Primary Examiner* — Anthony J Zimmer
*Assistant Examiner* — Syed T Iqbal
(74) *Attorney, Agent, or Firm* — Rauschenbach Patent Law Group, LLC; Kurt Rauschenbach

(57) ABSTRACT

A method and apparatus for decarbonizing gases using pressure swing in a first and second pressure vessel that each comprise a fixed bed sorbent. Syngas and steam are received in the first pressure vessel. A carbonation reaction is performed in the first pressure vessel that reacts carbonaceous species in the received syngas with the received steam to produce carbon dioxide and hydrogen. Decarbonated syngas is exhausted from first pressure vessel. A calcination reaction is performed in the second pressure vessel to produce carbon dioxide. A vacuum is provided to the second pressure vessel that causes carbon dioxide to exhaust from the second pressurized vessel at a pressure that substantially follows the decomposition pressure line.

30 Claims, 19 Drawing Sheets

(51) Int. Cl.
| | |
|---|---|
| *B01D 53/82* | (2006.01) |
| *B01D 53/62* | (2006.01) |
| *B01D 53/04* | (2006.01) |
| *B01D 53/047* | (2006.01) |
| *B01J 7/00* | (2006.01) |
| *C01B 3/56* | (2006.01) |

(52) U.S. Cl.
CPC ............ *B01D 53/62* (2013.01); *B01D 53/82* (2013.01); *B01J 7/00* (2013.01); *C01B 3/344* (2013.01); *C01B 3/56* (2013.01); *B01D 53/0446* (2013.01); *B01D 2251/404* (2013.01); *B01D 2251/602* (2013.01); *B01D 2253/1124* (2013.01); *B01D 2256/16* (2013.01); *B01D 2257/504* (2013.01); *B01D 2259/402* (2013.01); *C01B 2203/0216* (2013.01); *C01B 2203/0233* (2013.01); *C01B 2203/0283* (2013.01); *C01B 2203/043* (2013.01); *C01B 2203/0475* (2013.01); *C01B 2203/1058* (2013.01); *C01B 2203/1614* (2013.01); *Y02C 20/40* (2020.08); *Y02E 20/16* (2013.01); *Y02E 20/18* (2013.01); *Y02P 20/129* (2015.11); *Y02P 20/151* (2015.11)

(58) Field of Classification Search
CPC ............ C01B 2203/0216; C01B 3/344; C01B 2203/1614; C01B 2203/1058; C01B 2203/043; C01B 2203/0233; C01B 2203/0283; C01B 3/56; C01B 3/48; C01B 2203/0475; B01D 2259/40007; B01D 53/0423; B01D 53/0446; B01D 2257/504; B01D 53/047; B01D 2256/16; B01D 53/0438; B01D 2253/1124; B01D 2259/402; B01J 7/00
See application file for complete search history.

(56) References Cited

U.S. PATENT DOCUMENTS

| | | | |
|---|---|---|---|
| 4,013,395 A | 3/1977 | Wormser | |
| 4,051,791 A | 10/1977 | Wormser | |
| 4,135,885 A | 1/1979 | Wormser et al. | |
| 4,149,559 A | 4/1979 | Wormser | |
| 4,253,409 A | 3/1981 | Wormser | |
| 4,279,205 A | 7/1981 | Perkins et al. | |
| 4,279,207 A | 7/1981 | Wormser | |
| 4,303,023 A | 12/1981 | Perkins et al. | |
| 4,499,857 A | 2/1985 | Wormser | |
| 4,578,175 A | 3/1986 | Gorin | |
| 5,122,346 A | 6/1992 | Wormser | |
| 5,655,853 A | 8/1997 | Wormser | |
| 5,997,220 A | 12/1999 | Wormser | |
| 6,290,921 B1* | 9/2001 | Kuivalainen | B01D 53/346 423/210 |
| 6,863,820 B2* | 3/2005 | Cabrera | B01J 20/28042 210/198.2 |
| 6,877,322 B2 | 4/2005 | Fan | |
| 8,110,523 B2* | 2/2012 | Ryu | B01D 53/12 502/400 |
| 9,174,844 B2 | 11/2015 | Ramkumar et al. | |
| 2004/0045272 A1 | 3/2004 | Miyoshi et al. | |
| 2004/0237404 A1 | 12/2004 | Andrus et al. | |
| 2006/0168928 A1* | 8/2006 | Bardon | B01D 46/2451 55/523 |
| 2006/0207177 A1 | 9/2006 | Andrus et al. | |
| 2006/0260189 A1 | 11/2006 | Reddy et al. | |
| 2007/0261557 A1* | 11/2007 | Gadkaree | B01D 53/02 96/121 |
| 2010/0050654 A1 | 3/2010 | Chiu et al. | |
| 2010/0329963 A1 | 12/2010 | Richardson | |
| 2011/0113957 A1* | 5/2011 | Sceats | B01D 53/346 95/15 |
| 2012/0017555 A1* | 1/2012 | Iwasaki | B01D 46/2418 55/488 |
| 2012/0164032 A1* | 6/2012 | Wormser | C10B 49/10 422/162 |
| 2012/0167585 A1 | 7/2012 | Wormser | |
| 2012/0247080 A1 | 10/2012 | Ishii et al. | |
| 2012/0267577 A1 | 10/2012 | Sceats et al. | |
| 2014/0044632 A1* | 2/2014 | Zielinski | B01D 53/0415 423/230 |
| 2014/0158939 A1 | 6/2014 | Ramkumar et al. | |
| 2014/0296586 A1 | 10/2014 | Chandran et al. | |
| 2014/0352581 A1 | 12/2014 | Abanades Garcia et al. | |
| 2018/0073430 A1 | 3/2018 | Forrest et al. | |

FOREIGN PATENT DOCUMENTS

| | | |
|---|---|---|
| CN | 1011005139 A | 7/2007 |
| CN | 101618292 A | 1/2010 |
| CN | 102549119 A | 7/2012 |
| CN | 102549119 A | 7/2012 |
| CN | 102575178 A | 7/2012 |
| CN | 102665871 A | 9/2012 |
| EP | 0067580 A1 | 12/1982 |
| EP | 2457636 A1 | 5/2012 |
| JP | S5749719 A | 3/1982 |
| JP | S6099017 A | 6/1985 |
| WO | 2010045232 A2 | 4/2010 |
| WO | 2011047409 A1 | 4/2011 |
| WO | 2013-109616 A1 | 7/2013 |

OTHER PUBLICATIONS

"Notification of Transmittal of the International Search Report and the Written Opinion of the International Searching Authority, or the Declaration" for International Patent Application No. PCT/US2016/055602, dated Jan. 11, 2017, 13 pages, International Searching Authority/KR, Korean Intellectual Property Office, Daejeon, Republic of Korea.

"Notification of the Transmittal of the International Search Report and the Written Opinion of the International Searching Authority, or the Declaration", for International Patent Application No. PCT/US2018/013317, dated Apr. 30, 2018, 10 pages, Korean Intellectual Property Office ISA/KR, Daejeon, Republic of Korea.

Rietveld, et al. Commercialization of the ECN MILENA Gasification Technology, Jun. 2014, 21 pages.

Twin IHI Gasifier (TIGAR®), Current Status of Indonesian Demonstration Project and its Business Plan, Oct. 18, 2016, 19 pages, IHI Corporation, Vancouver, Canada.

"Notification Concerning Transmittal of International Preliminary Report on Patentability (Chapter I of the Patent Cooperation Treaty)", for International Patent Application No. PCT/US2016/045268, dated Feb. 15, 2018, 6 Pages, The International Bureau of WIPO, Geneva, Switzerland.

Butler, "Limestone as a Sorbent for CO2 Capture and its Application in Enhanced Biomass Gasification", Oct. 2013, 279 pages, The University of British Colombia, Vancouver, Canada.

"Notification Concerning Transmittal of International Preliminary Report on Patentability (Chapter I of the Patent Cooperation Treaty)", for International Patent Application No. PCT/US2016/055602, dated Apr. 19, 2018, 9 pages, International Bureau of WIPO, Geneva, Switzerland.

"Search Report" for European Patent Application No. 16854265.2, dated Apr. 25, 2019, 8 pages, European Patent Office, Munich, Germany.

"First Office Action" for Chinese Patent Application No. 201680058328. 6, dated Apr. 2, 2020, 19 pages, China National Intellectual Property Administration, Beijing, China.

"First Examination Report" for Indian Patent Application No. 201837006490, dated Feb. 19, 2020, 6 pages, Intellectual Property India, Kolkata, India.

"Second Office Action" for Chinese Patent Application No. 201680058328.6, dated Oct. 22, 2020, 20 pages, China National

(56) References Cited

OTHER PUBLICATIONS

Intellectual Property Administration, Beijing, China.
Fan Shasha, "Preparation of calcium oxide-based adsorbent and its $CO_2$ adsorption performance", China Excellent Master's Thesis Full-text Database, Engineering Technology Series I, May 15, 2017, No. 05. pp. B016-241.
"Third Office Action" for Chinese Patent Application No. 201680058328.6, dated May 6, 2021, 5 pages, China National Intellectual Property Administration, China.
"Notice of Allowance" for Chinese Patent Office No. 201680058328.6, dated Jun. 3, 2021, 2 pages, China National Intellectual Property Administration, Beijing, China.

* cited by examiner

METHOD AND APPARATUS FOR ADIABATIC CALCIUM LOOPING

CROSS REFERENCE TO RELATED APPLICATION

The present application is a non-provisional application of U.S. Provisional Patent Application No. 62/237,709 entitled "Advanced Adiabatic Calcium Looping" filed on Oct. 6, 2015. The entire contents of U.S. Provisional Patent Application No. 62/237,709 are herein incorporated by reference.

INTRODUCTION

Global warming concerns about $CO_2$ greenhouse gas accumulation in the atmosphere continue to grow. Atmospheric concentrations of $CO_2$ are increasing. $CO_2$ emissions from fossil fuel energy generation systems are a major culprit in the recent few decades of increasing $CO_2$ in the atmosphere. At the same time, the demand for and use of fossil fuels worldwide continues to grow. Even with major increases in renewables and nuclear energy sources, the growth of fossil fuel consumption continues to rise. As such, there is a significant need for efficient and effective low-carbon technologies, especially for power generation and chemical production.

Integrated gasification combined cycle (IGCC) technology is the cleanest way to make energy from coal. Gasification results in significantly fewer pollutants than produced by conventional coal power plants. An IGCC power plant burns syngas in a turbine to produce electricity. The excess heat is captured to power a second turbine that produces more electricity, resulting in high-efficiency power generation. Gasification of various solid fuels to produce chemicals including fertilizers, methanol, diesel fuel, and many other chemicals is common today. Gasification is beneficial to the environment, resulting in less pollution, reduced carbon dioxide emission, less solid waste, and lower water use. See, for example, U.S. patent application Ser. No. 15/227,137, filed Aug. 3, 2016, entitled "All-Steam Gasification with Carbon Capture," which is assigned to the present assignee. The entire contents of U.S. patent application Ser. No. 15/227,137 are incorporated herein by reference.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
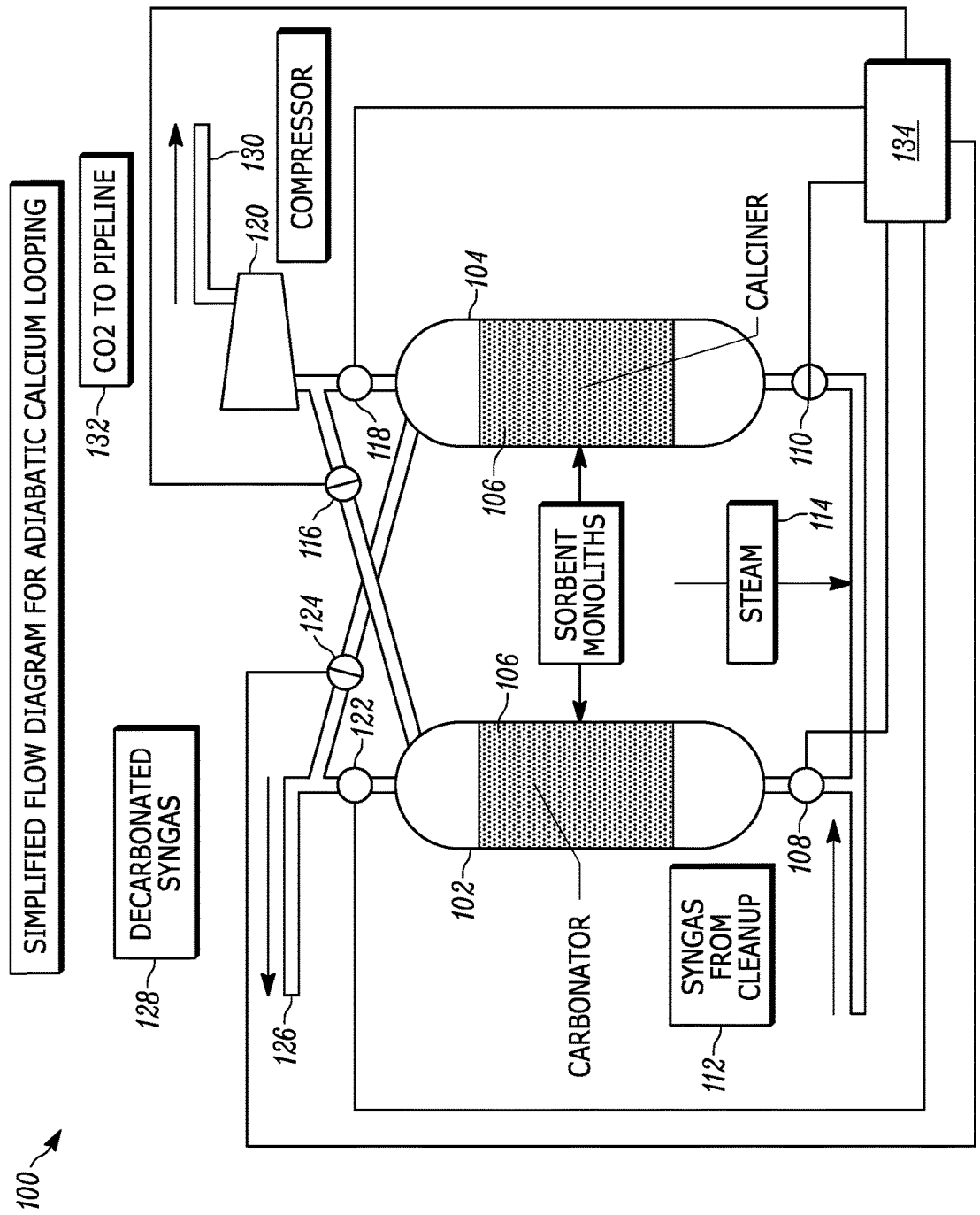
FIG. 1 illustrates a simplified diagram of an embodiment of a fixed bed adiabatic calcium looping apparatus of the present teaching.

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teaching may be performed in any order and/or simultaneously as long as the teaching remains operable. Furthermore, it should be understood that the apparatus and methods of the present teaching can include any number or all of the described embodiments as long as the teaching remains operable.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

The present teaching relates to adiabatic, adsorption, pressure-swing, fixed bed carbon-capture systems for removing the carbon compounds from the syngas or products of combustion made from solid or liquid fossil fuels for a combined-cycle power plant, fuel-to-liquids plant, or polygeneration plant. The methods and apparatus of the present teaching can be used to remove the carbon dioxide from a pressurized stream of products of combustion. The methods and apparatus of the present teaching can also be used to remove carbon dioxide, or also to provide the water-gas shift reaction, in which steam converts carbon monoxide into hydrogen and carbon dioxide. In addition, the methods and apparatus of the present teaching can be used to convert methane into carbon dioxide and hydrogen, with all three processes occurring in the same vessel.

The methods and apparatus of the present teaching apply to conventional gasification systems, where air or oxygen is introduced into the chamber that produces syngas. Alternatively, the methods and apparatus of the present teaching can be used with indirect gasifiers that provide for separated chambers or vessels, one for combustion and the other for gasification, in which the heat from combustion is transferred to the gasifier by circulating hot solids.

In some embodiments, the $CO_2$ captured by the methods and apparatus of the present teaching is cooled, compressed, and piped away for sequestration in saline, or for utilization by enhanced oil recovery (EOR) or other uses, such as dry methane reforming.

These present teachings are meant to distinguish from prior art systems that circulated sorbent between vessels operating at different pressures and temperatures. The present teaching is also an improvement over prior art systems with smaller temperature changes over the course of a cycle.

The conventional technology for carbon capture from IGCCs and other coal-gasification systems, is an amine-based system such as Selexol or Rectisol. Both use liquid streams to absorb carbon dioxide (CO2) from syngas, which is later regenerated in a separate reactor with heat provided by steam. The carbon capture system is preceded by a shift reactor, which converts the CO in syngas into hydrogen and $CO_2$. The $CO_2$ is then captured by the acid-gas system.

Most of the prior art development of calcium looping is applied to post-combustion carbon capture applications, whereby the two reactors are at the same pressure, but different temperatures, which is a process that is referred to as temperature-swing calcium looping. In temperature-swing calcium looping, typically two fluidized bed reactors are used. One fluidized bed reactor burns fuel to provide the heat of calcining, while the other has coolers that absorb the heat of carbonation.

Problems with temperature-swing calcium looping include the large amount of heat required in the calciner, which may be as much as a third of the energy used in the power plant. The heat is recovered by heat exchangers in the carbonator. These heat exchangers are large and costly. The heat recovered by the heat exchangers is used in steam turbines and produces power at a lower efficiency than if the heat were used by the IGCC.

A second limitation of prior art temperature-swing calcium looping is the high attrition rates of the sorbent particles, where as much as 60% of the sorbent is lost in only one day. The cost of this is prohibitive in all applications except cement plants, where the attrited material can then be used in the cement kiln.

A third limitation of prior art temperature-swing calcium looping is that the fuel in the calciner must be burned with oxygen instead of air in order to avoid contamination of the $CO_2$ by nitrogen in the air. This further adds to the cost, while further lowering the plant efficiency.

The pressure-swing calcium looping, which also referred to as adiabatic calcium looping, of the present teaching overcomes all three of these limitations of prior art systems. Adiabatic refers to a process in which no heat is added to, or removed from, the sorbent. Instead, the heat for the reactions is provided or removed by changes in the temperature of the sorbent itself. This means that the sorbent heats up during carbonation and cools back to its original temperature during calcination, before the cycle is repeated.

One advantage of the adiabatic calcium looping apparatus of the present teaching is a relatively small equipment size. Embodiments of the adiabatic calcium looping apparatus of the present teaching are typically about seven-times smaller than conventional air-blown equipment of the prior art. Other benefits include higher plant efficiency, higher carbon-capture efficiency (97% vs the 90%), and the ability to perform all of the required reactions, such as the water-gas shift reaction, the carbonation, and the steam reforming of methane in a single vessel. The sorbent is also non-toxic, unlike the conventional amine sorbents. Furthermore, the sorbent does not require external regeneration heat unlike the conventional amine sorbents.

The water-gas shift reaction is sometimes also referred to as the shift reaction. The water-gas shift reaction is an important reaction for carbon capture and for generating clean energy and chemical production from coal and other carbonaceous fuels. The well-known shift reaction is the conversion of CO and $H_2O$ into $H_2$ and $CO_2$. The shift reaction can operate with a variety of catalysts and at a range of temperatures.

Steam reforming of methane (SMR) is a method of producing hydrogen and carbon monoxide from methane using steam and a catalyst. Both the water-gas shift reaction and steam methane reforming are important examples of process intensification for carbon capture systems. This is because using the apparatus and method of the present teaching, they can occur in the same vessels. This leads to significant cost reduction and high capture rate for carbon capture systems. Thus, a feature of the present teaching is that a single pressure vessel performs both a water-gas shift reaction and a steam methane reforming reaction.

One advantage of the adiabatic calcium looping apparatus of the present teaching is that its operation enables the heat from the shift reaction to be recovered at high temperature. Recovering the heat at high temperature produces much more steam or power than from the lower-temperatures of prior art shift reactor heat recovery systems. Other efficiency improvements stem from the ability to forgo the catalysts needed for the shift reactions of conventional systems, which eliminates the excess steam the latter needs to prevent carbon buildups on the catalysts. The adiabatic calcium looping apparatus of the present teaching also avoids the need for steam to regenerate the sorbent. Calcium looping captures the carbon from the gases in one reactor (the "carbonator"), and releases carbon dioxide from the sorbent in a second reactor, (the "calciner").

FIG. 1 illustrates a diagram of an embodiment of a fixed-bed adiabatic calcium looping apparatus 100 of the present teaching. FIG. 1 diagrams a simplified flow diagram for adiabatic calcium looping. The fixed-bed adiabatic calcium looping apparatus 100 comprises a first pressure vessel 102 and a second pressure vessel 104. Each pressure vessel 102, 104 contains the same type of sorbent monolith 106. The sorbent may comprises pellets of sorbent material. As described in more detail later in this specification, these sorbents capture and release $CO_2$ based on operating conditions in the pressure vessels 102, 104. The first and second pressure vessels 102, 104 may also include sensors that monitor for saturation of carbon dioxide.

The first and second pressure vessels 102, 104 may include a heater that controls a temperature of the fixed bed sorbent to a temperature at which it decarbonizes the carbonaceous gases. The temperature may also be controlled to a temperature that optimizes decarbonization and/or that optimizes sintering of the fixed bed sorbent.

Each pressure vessel includes a port with a valve 108, 110 that is connected to a supply of syngas from clean-up 112. In various embodiments, the syngas may be supplied from a variety of sources. The syngas comprises a variety of carbonaceous species, including carbon monoxide, methane, carbon dioxide and hydrogen. Different sources of syngas may comprise different carbonaceous species, and not all species are present in all syngas. Steam 114 is also added at this location proximate to the valves 108, 110. Each pressure vessel 102, 104 includes a port with a valve 116, 118 connected to a compressor 120. Each pressure vessel 102, 104 includes a port with a valve 122, 124 that is connected to an output 126 of the fixed-bed adiabatic calcium looping apparatus 100 that expels decarbonated syngas 128 at the output 126. At the point in the cycle illustrated in FIG. 1, valve 108 and valve 122 are in the open configuration while valve 116 is in the closed configuration on the first pressure vessel 102. This causes high-pressure syngas to enter and pressurize the first pressure vessel 102. In this valve configuration, the first pressure vessel 102 operates as a carbonator. Valve 110 and valve 124 are in the closed configuration and valve 118 is in the open configuration on the second pressure vessel 104. This valve configuration causes sufficient vacuum from the compressor 120 in the second pressure vessel 104 for calcination, causing a release of carbon dioxide from the second pressure vessel. The output of the compressor 120 is connected to an output 130 of the fixed bed adiabatic calcium looping apparatus 100. $CO_2$ to pipeline 132 exits from output 130 of the fixed bed adiabatic calcium looping apparatus 100.

The question of which process occurs, carbonation or calcination, depends on which side of the dissociation line are the gases surrounding the sorbent. Carbonation is exothermic, while calcination is endothermic. The quantity of heat absorbed in calcination is the same as the amount of heat released in carbonation, so the process is reversible, leading to the term "looping." Looping enables the sorbent to be re-used many times, thereby minimizing the costs. Looping is enabled by a combination of maintaining the compressor pressure low on the side connected to the valves 116, 118 connected to pressure vessels 102, 104 and maintaining a high input pressure at the valves 108, 110 connecting the pressure vessel ports to the syngas from clean-up 112. Valves 108, 110, 116, 118, 122, and 124 are opened and closed appropriately to produce high pressure in the pressure vessel acting as a carbonator, and low pressure in the pressure vessel acting as a calciner. In the looping operation, the valve configuration cycles as the carbonation and calciner processes cycle. In some embodiments, the end of each cycle occurs when all of the sorbent in the carbonator nears saturation. The switching of the valve configuration causes a pressure swing in the vessels. This is referred to as a pressure swing reaction.

A controller 134 is connected to valves 108, 110, 116, 118, 122, and 124. The controller 134 actuates the valves at the end of each cycle, which causes the pressure vessels 102, 104 to switch from performing calcination to performing carbonation and vice versa. The water-gas shift reaction and a carbonation reaction are both performed in a single pressure vessel. In some embodiments steam reformation of methane is also performed in the same pressure vessel. Catalysts may be included in the fixed bed sorbent. In some embodiments, these reactions are performed simultaneously. In some embodiments, the controller 134 determines the timing of a cycle by monitoring a peak temperature of the sorbent near its outlet.

Calcium looping optimally occurs at relatively high temperatures. In some embodiments, temperatures for the adiabatic calcium looping of the present teaching are typically between 800° C. to 950° C. If the minimal temperature is too low, the power needed to compress the $CO_2$ to pipeline pressures rises disproportionally to the benefits, while at temperatures that are too high, the sorbent sinters, rendering it less reactive.

The carbonation reaction occurring in one of the vessels reacts the carbonaceous species in the syngas to produce decarbonized syngas. In some embodiments, the decarbonized syngas comprises hydrogen. The carbon dioxide produced by carbonation is captured in the sorbent.

The syngas contains one or more of the following gases: CO (carbon monoxide), $CO_2$, (carbon dioxide) and $CH_4$ (methane). The $CO_2$ in syngas is captured directly by calcium looping, while the CO in the syngas must first be converted into $CO_2$ by the water gas shift reaction, in which the CO reacts with steam to form $CO_2$ and $H_2$. Similarly, the $CH_4$ can be steam-reformed to produce hydrogen and $CO_2$.

The syngas has a very low concentration of hydrogen sulfide to avoid poisoning the catalyst.

A Sorbent-Enhanced Reaction (SER) works only because the sorbent removes the $CO_2$ of the shift reaction as soon as it is formed. This creates a very low partial pressure of $CO_2$, which, in accordance with the Le Chatelier principal, enables the shift reaction to occur at significantly higher temperatures than in the absence of sorbent. In some embodiments, both sorbent enhancement and steam methane reforming processes occur. This is referred to by the acronym SM-SER, where the SM refers to steam-methane reforming. Steam methane reforming is a process in which methane in a gas is heated using steam as a catalyst to produce hydrogen and carbon dioxide. One feature of the present teaching is the processing of both a sorbent-enhanced water-gas shift reaction and a steam methane reforming reaction using the same sorbent in the same vessel, resulting in lower cost and higher carbon capture efficiency than prior art systems.

In the apparatus shown in FIG. 1, no heat is added to, or removed from, the sorbent monoliths 106. Instead, the heat for the reactions is provided or removed by changes in the temperature of the sorbent itself. This means that the sorbent heats up during carbonation and cools back to its original temperature during calcination, before the cycle is repeated. The adiabatic calcium looping apparatus 100 uses fixed-bed reactors 102, 104 with valving to alternate the function of each reactor at the end of each cycle. In some embodiments, the end of each cycle occurs when all of the sorbent in the carbonator nears saturation.

Figure 2:
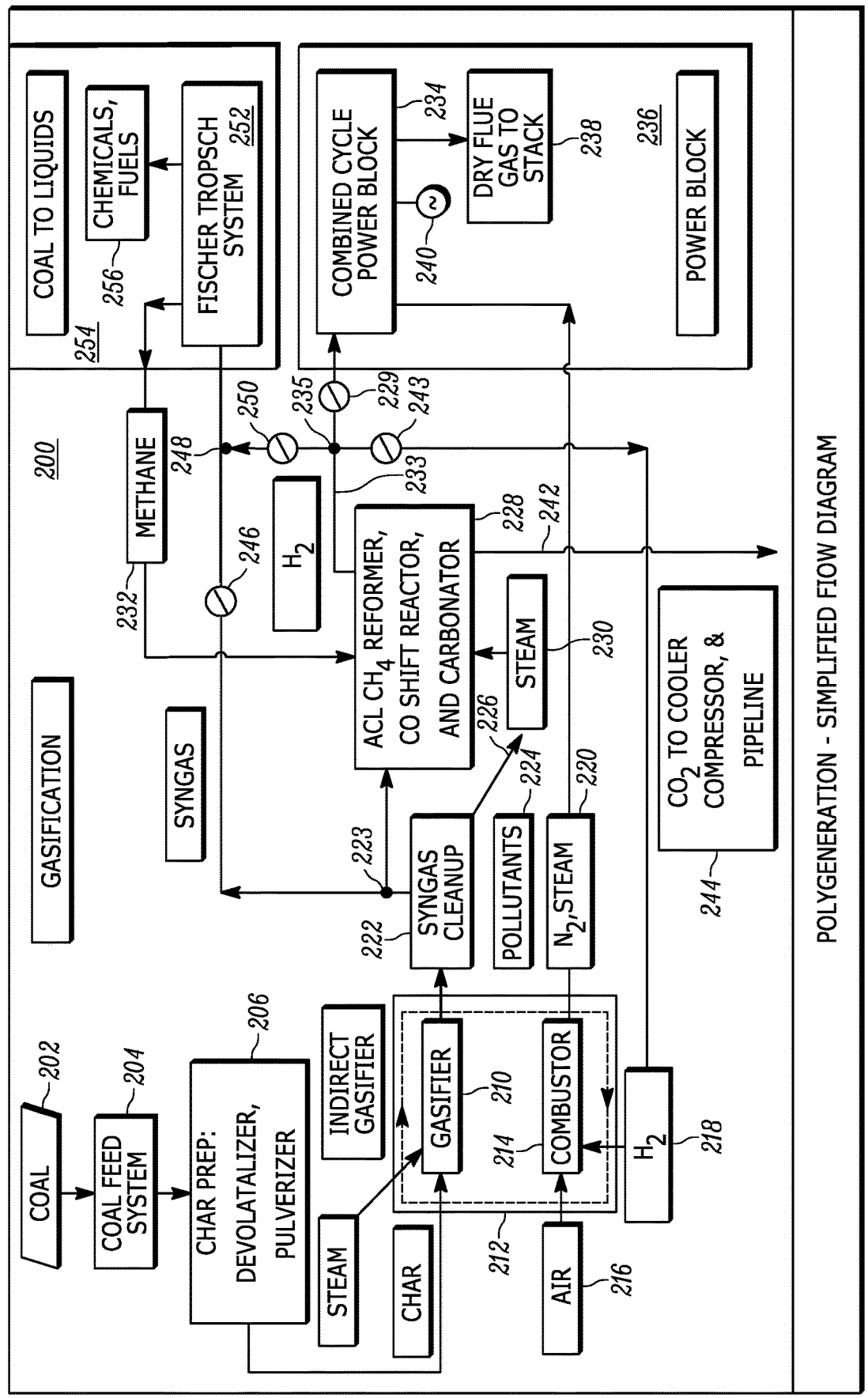
FIG. 2 illustrates a block diagram of a simplified flow diagram of an embodiment of a polygeneration system of the present teaching.

FIG. 2 illustrates a block diagram of a simplified flow diagram of an embodiment of a polygeneration system 200 of the present teaching. Polygeneration refers to a power plant that includes chemical production. Coal 202 is input into a coal feed system 204 that feeds a char preparation system 206. The char preparation system 206 includes a devolatizer and a pulverizer. Char 208 from the char preparation system 206 is provided to a gasifier 210 that is part of an indirect gasifier 212. The indirect gasifier 212 also comprises a combustor 214. The combustor 214 takes in air 216 and $H_2$ 218 and produces a mixture of $N_2$ and steam 220. The output of the gasifier 210 enters a syngas clean-up system 222 that removes pollutants 224 at an exhaust 226. The output of the syngas clean-up 222 is split into two parts at splitter 223 and part of the output is provided to an adiabatic calcium loop $CH_4$ reformer, CO shift reactor and carbonator reactor 228.

The adiabatic calcium loop $CH_4$ reformer, CO shift reactor and carbonator reactor 228 also takes in steam 230 and methane 232. A first output 233 of the adiabatic calcium loop $CH_4$ reformer, CO shift reactor and carbonator reactor 228 supplies $H_2$. The first output 233 is split three ways at a splitter 235. One output of the splitter 235 is connected through a valve 229 to a combined cycle power block 234 that is part of a power block 236. The combined cycle power block 234 is also supplied a mixture of $N_2$ and steam 220 from the combustor 214. The power block 236 also comprises a dry flue 238 that supplies gas from the combined cycle power block 234 to a stack. The power block 236 generates power 240. A second output 242 of the adiabatic calcium loop $CH_4$ reformer, CO shift reactor and carbonator reactor 228 supplies $CO_2$ to cooler compressor and pipeline 244.

One output from splitter 223 supplying clean syngas is connected through valve 246 to a combiner 248. The combiner 248 joins an output from the splitter 235 supplying hydrogen that is connected to the combiner 248 through valve 250. The output of combiner 248 is connected to a Fischer Tropsch system 252 that is part of a coal-to-liquids reactor 254. The coal-to-liquids reactor 254 produces chemicals and fuels 256. Methane gas 232 is supplied at an output of the Fischer Tropsch system 252, and provided to an input of the adiabatic calcium loop $CH_4$ reformer, CO shift reactor and carbonator reactor 228. One output of the splitter 235 connected to the adiabatic calcium loop $CH_4$ reformer, CO shift reactor and carbonator reactor 228 is connected through valve 243 to supply the $H_2$ 218 to the combustor 214.

The H2/CO ratio going to the coal-to-liquids reactor 254 is specific to each chemical to be produced. This can readily be adjusted to the required level by controlling the four valves 229, 243, 246, 250 surrounding the outlet of the adiabatic calcium loop $CH_4$ reformer, CO shift reactor and carbonator reactor 228. Adjusting the CO—$H_2$ ratio of prior art systems is much more difficult.

As previously described, adiabatic calcium looping employs one or more pairs of pressure vessels where one pressure vessel comprises a carbonator and the other pressure vessel comprises a calciner. The flow through the carbonator is driven by the high pressure of the syngas conveyed through it. The low pressure in the calciner is created by having the calciner's output coupled to a heat exchanger that provides cooling. The output of the heat exchanger is coupled to an entrance of the first stage of a compressor, whose inlet is operated at the low pressure required to calcine the sorbent in the calciner. The compressor and its subsequent stages serves to compress the carbon dioxide to the pipeline pressure for sequestration. In some embodiments, the compressor is staged. Also, in some embodiments, the compressor includes intercoolers, which are provided to increase the compressor efficiency.

Figure 3:
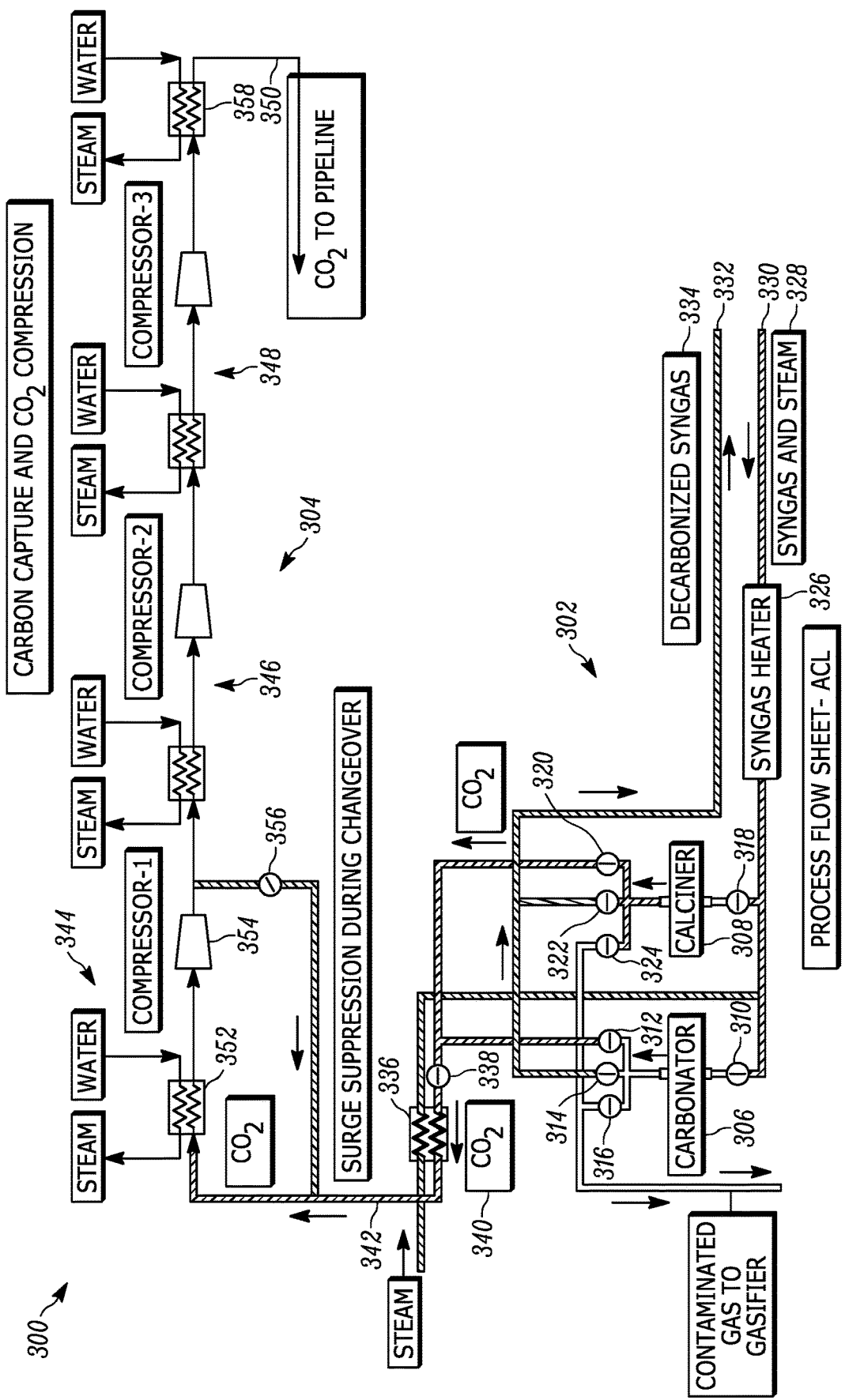
FIG. 3 illustrates a diagram of a process flow sheet of an embodiment of an apparatus of adiabatic calcium looping and $CO_2$ compression of the present teaching.

FIG. 3 illustrates an embodiment of an adiabatic calcium looping and $CO_2$ compression apparatus 300 of the present teaching. The adiabatic calcium looping and $CO_2$ compression apparatus 300 comprises an adiabatic calcium looping reactor portion 302 and a $CO_2$ compression portion 304. The adiabatic calcium looping reactor portion 302 includes a first pressure vessel 306 containing a solid sorbent and a second pressure vessel 308 containing a solid sorbent. The first pressure vessel 306 has four ports that are controlled by valves 310, 312, 314, and 316. The second pressure vessel 308 has four ports that are controlled by valves 318, 320, 322, and 324. Valves 310, 314, and 320 are open and valves 312, 316, 318, 322 and 324 are closed. Valves 310, 318 connect the first and second pressure vessels 306, 308 to a syngas heater 326 that is provided syngas and steam 328 at an input 330. Valves 314, 322 connect the first and second pressure vessels 306, 308 respectively to an output 332 of the adiabatic looping portion 302 that provides decarbonized syngas 334. Valves 312, 320 connect the first and second pressure vessels 306, 308 respectively to heat exchanger 336 via a valve 338. Valves 312, 320, 338 pass $CO_2$ when open. Valves 316, 324 connect the first and second pressure vessels 306, 308 respectively to a gasifier (not shown) and provide contaminated gas to the gasifier when the valves 316, 324 are open. The heat exchanger 336 connects the adiabatic calcium looping reactor portion 302 to the $CO_2$ compression portion 304.

When the configuration of valves 310, 314, and 320 are open and the configuration of valves 312, 316, 318, 322 and 324 are closed, the first pressure vessel 306 operates as a carbonator, and the second pressure vessel 308 operates as a calciner. That is, closed valves 318, 322, 324 and open valve 320 together with open valve 338 connecting pressure vessel 308 to the compressor results in low pressure in pressure vessel 308 that causes the sorbent to release $CO_2$ When valve 310 is open, valve 312 is closed, valve 316 is closed, and valve 314 is opened connecting pressure vessel 306 to the output 332, both a water shift reaction and adsorption of $CO_2$ in the sorbent in the pressure vessel 306 produces decarbonized syngas 334.

In the embodiment of the method shown in FIG. 3 where pressure vessel 306 is configured as a carbonator, and pressure vessel 308 is configured as a calcinator, syngas and steam 328 enter the adiabatic calcium looping portion 302, $CO_2$ 340 exits to an input 342 of the $CO_2$ compression portion 304, and decarbonized syngas 334 exits via output 332. In a similar manner as described in connection with FIG. 1, looping operation cycles the pressure vessels between carbonator and calciner operation. At each cycle, valves 310, 312, 314, 316, 318, 320, 322, and 324 are configured to support the operating conditions in the pressure vessels 306, 308 consistent with a carbonation or calciner process, and to collect and expel the associated products.

The $CO_2$ compression portion 304 comprises a series of three heat-exchanger/compression stages 344, 346, and 348. The $CO_2$ compression portion 304 produces low pressure at the pressure vessel 308 configured as a calciner, and produces a high pressure at an output connected to a pipeline 350. In one specific embodiment, the pressure at the output connected to a pipeline 350 is approximately 2200 lbs., and the pressure after heat exchanger 336 is approximately 3 lbs. Each heat-exchanger/compression stage includes a heat exchanger 352 and compressor 354. The output of the first heat-exchanger/compression stage 344 is connected back to the input 342 through a valve 356. This valved loop provides surge suppression during changeover of the pressure vessels 306, 308 from calciner to carbonator roles when valves 310, 314, and 320 are switched off and valves 312, 318 and 322 are switched on. The last heat-exchanger/compression stage 348 is connected to a heat exchanger 358 and the output 350 that provides $CO_2$ to pipeline.

Figure 4:
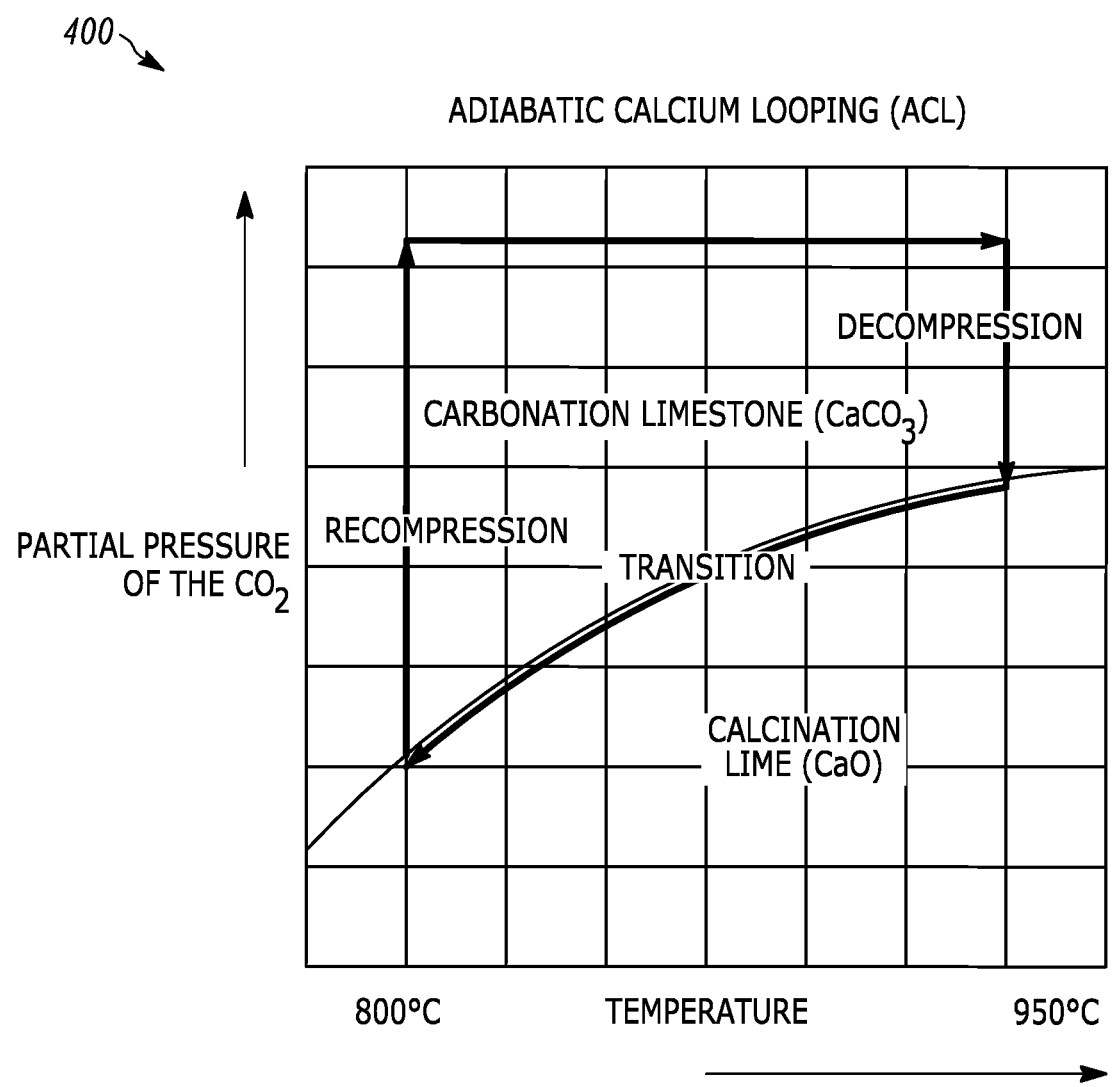
FIG. 4 illustrates a graph representing a temperature cycle of the sorbent during an embodiment of an adiabatic calcium looping cycle of the present teaching.

FIG. 4 illustrates a graph 400 representing a temperature cycle of the sorbent during an embodiment of an adiabatic calcium looping cycle of the present teaching. As described in connection with FIG. 1, the gases surrounding the sorbent relative to the dissociation line determines whether a carbonation or calcination process proceeds in the solid sorbent. The dissociation line is the diagonal line across the chart. Carbonation occurs when the sorbent is in the top-left sector, and calcination occurs in the opposite sector. Thus, higher partial pressure of the $CO_2$ in the pressure vessel is consistent with carbonation, and lower partial pressure of the $CO_2$ in the pressure vessel is consistent with calcination.

Figure 5:
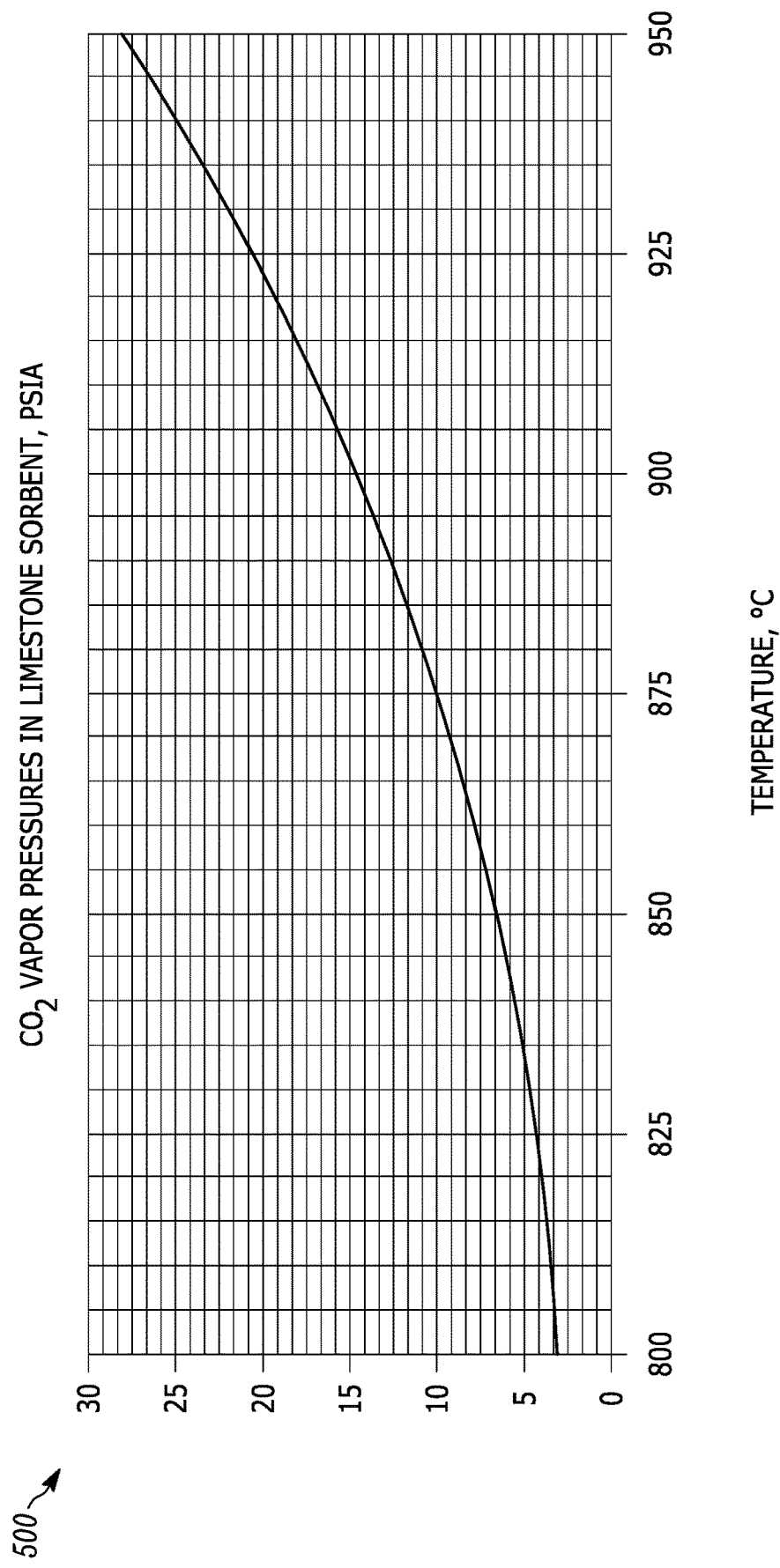
FIG. 5 illustrates a graph of $CO_2$ vapor pressures versus temperature for an embodiment of a limestone sorbent of the present teaching.

If the sorbent were composed entirely of the chemically-active compound in calcium looping, CaO, the heat generated during carbonation would increase the sorbent temperature by 1195° C., and vice versa with calcination. Such a large temperature swing far exceeds the optimal temperature shift during calcium looping, which is 150° C., the difference between the 800° C. and 950° C. shown in FIG. 4. Lowering the temperature swing to the desired range is achieved by mixing the appropriate amount of chemically-inert material with the limestone to serve as a heat sink in order to limit the temperature shift caused by the chemically-active part of the sorbent. FIG. 5 illustrates a graph 500 of $CO_2$ vapor pressures versus temperature for an embodiment of a limestone sorbent of the present teaching.

Figure 6:
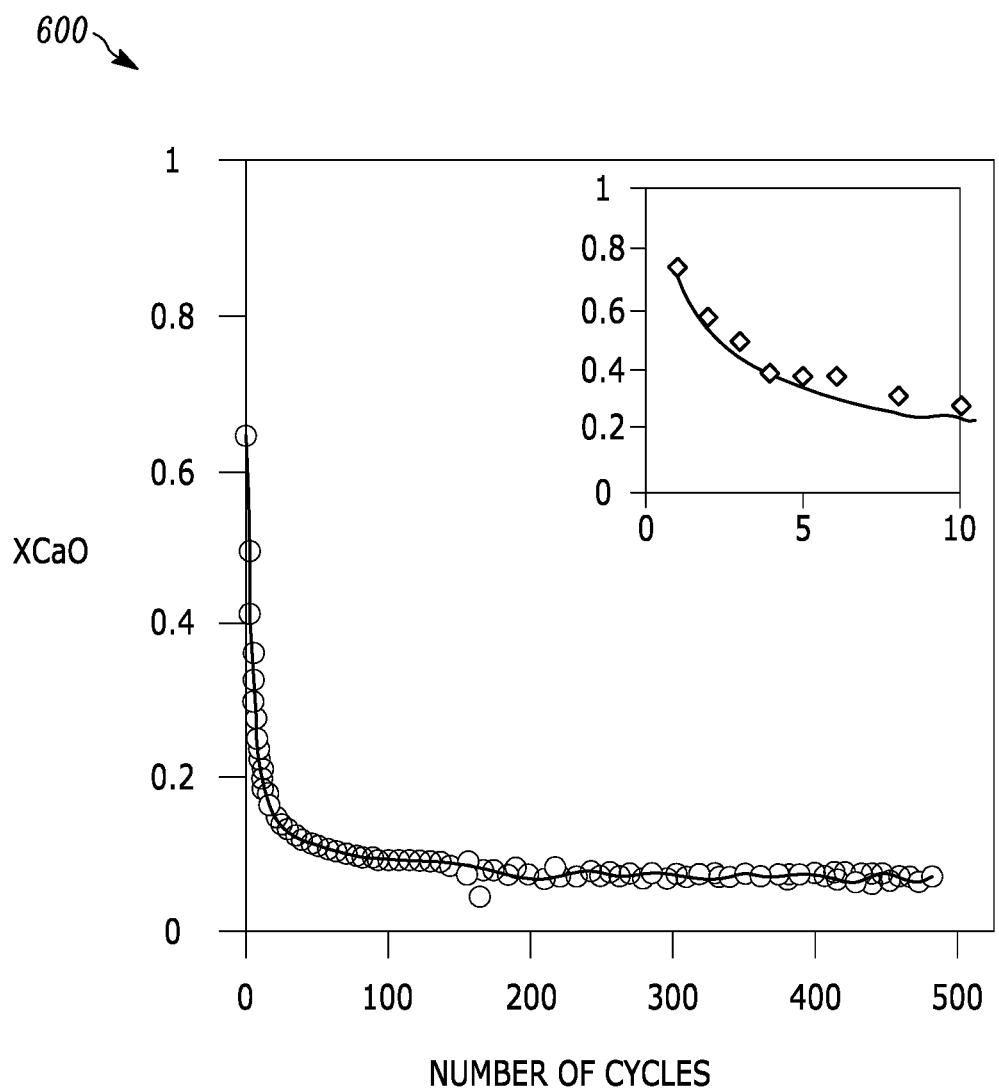
FIG. 6 illustrates a graph representing the reactivity of plain untreated limestone used in an embodiment of the adiabatic calcium looping method of the present teaching.

Without using a heat sink, the reactivity of sorbent made from pure limestone quickly drops in only a few cycles due to sintering. FIG. 6 illustrates a graph 600 representing the reactivity of plain untreated limestone used in an embodiment of the adiabatic calcium looping method of the present teaching. Sintering reduces the surface area of the pores within the sorbent. If limestone were the only material used to make the sorbent, its reactivity would drop until it reached equilibrium reactivity of only 7%, lower than what is needed.

Figure 7:
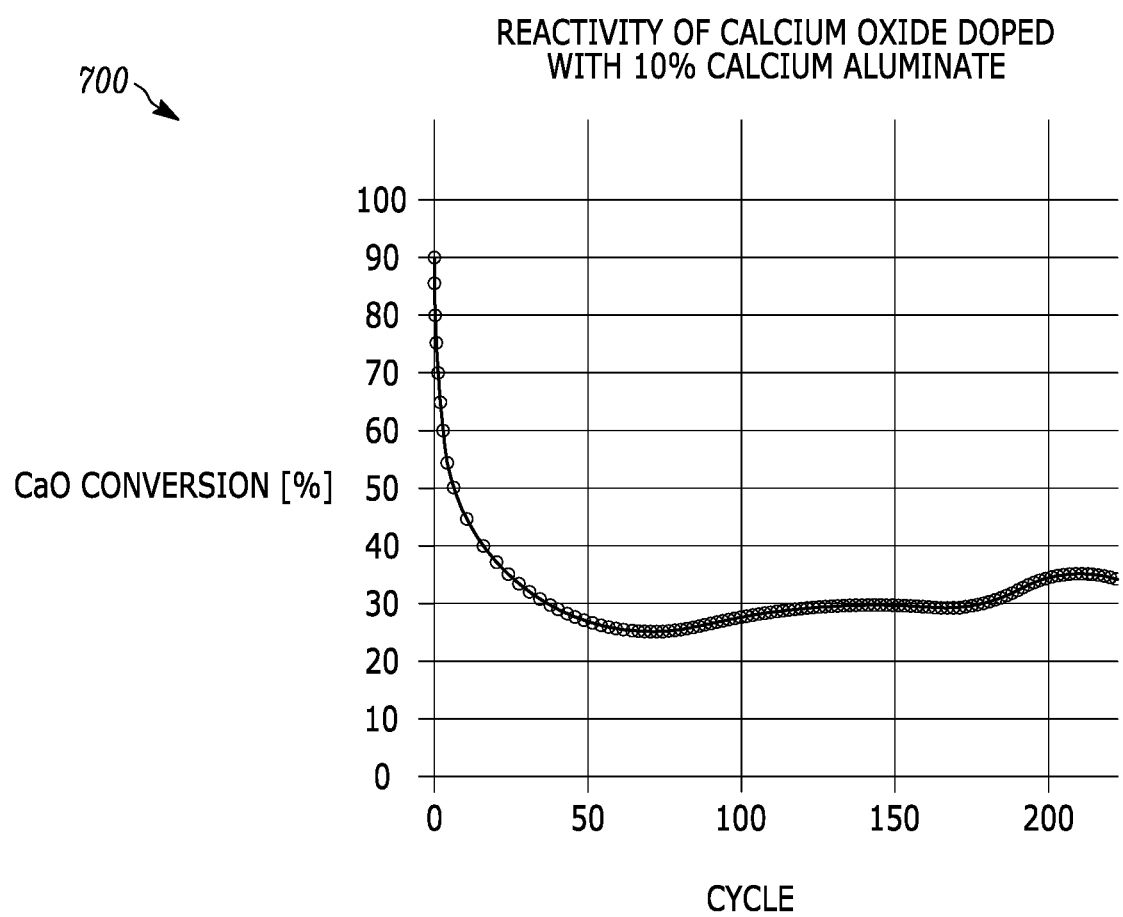
FIG. 7 illustrates a graph representing the reactivity of limestone doped with calcium aluminate used in an embodiment of the adiabatic calcium looping method of the present teaching.
Figure 8:
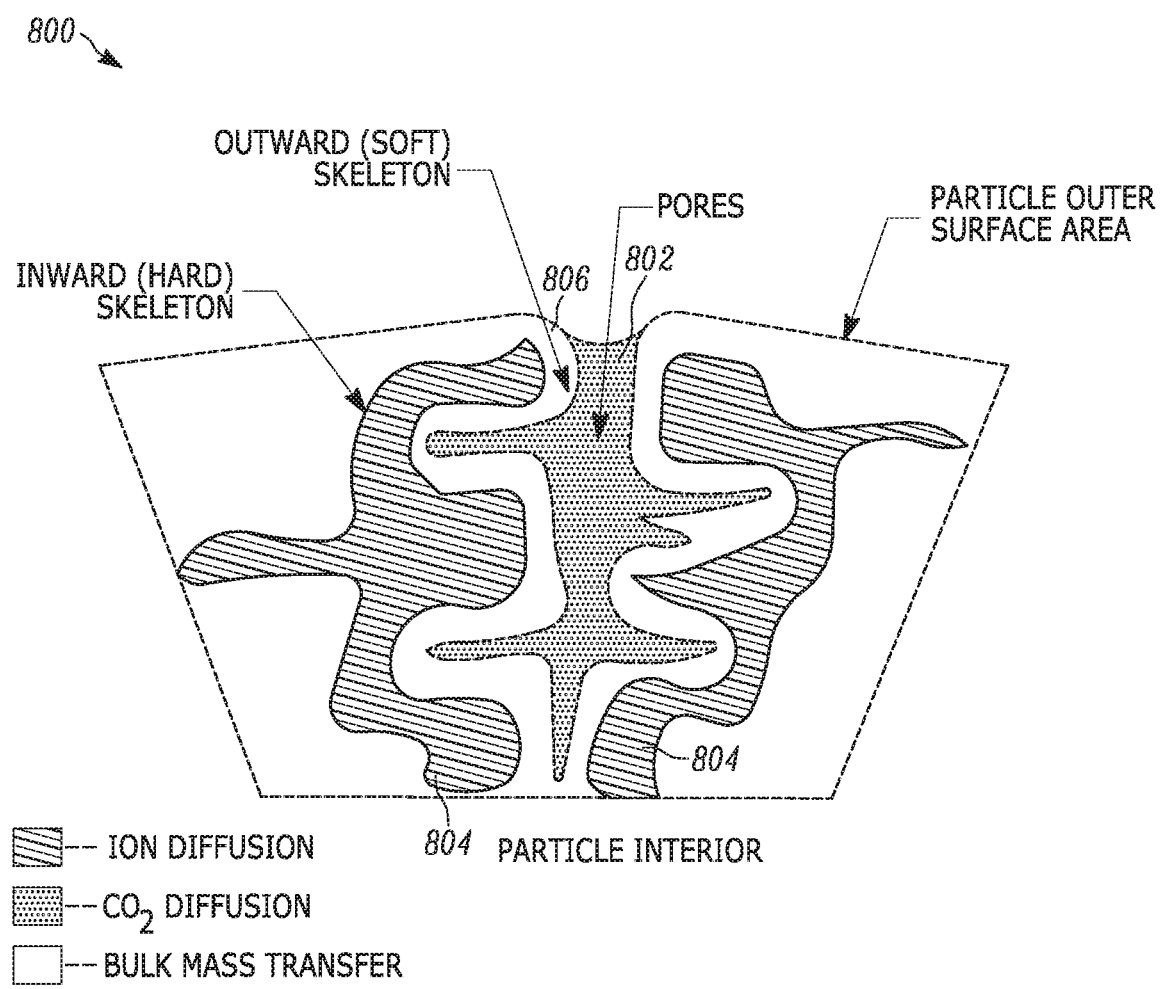
FIG. 8 illustrates a schematic drawing of a particle with selected additives that increase the permeability of sorbent at high temperature in an embodiment of an adiabatic calcium looping method of the present teaching.

One feature of the present teaching is the use of additives in the limestone sorbent that serve as heat sinks to increase reactivity by opening up passages within the sorbent. FIG. 7 illustrates a graph 700 representing the reactivity of limestone doped with calcium aluminate. The calcium oxide is doped with ten percent calcium aluminate. In this embodiment, CaO conversion percent remains around 30% for hundreds of cycles. The effects of sintering are also reduced by mixing an appropriate additive to the limestone, such as a calcium aluminate. FIG. 8 illustrates a schematic drawing 800 of a particle with selected additives that increase the permeability of sorbent at high temperature. Pores 802 support $CO_2$ diffusion. Ion diffusion takes place in inner hard sections 804. Pores 802 are surrounded by outward soft sections that support bulk mass transfer. The use of an additive, such as calcium aluminate, opens passages within the sorbent that counters the effects of sintering by providing additional passages to the pores 802.

In some embodiments, the temperature range of the adiabatic looping cycle of the present teaching is 800-950° C. The lower temperature, 800° C., is established by the tradeoff of increased capture efficiency of even lower temperatures against the increased power required for the $CO_2$ compressor that brings the gas to the pipeline pressure at lower temperatures. The higher limit, 950° C., is established by the tradeoff between using smaller, more economical pressure vessels which use higher temperatures versus the greater frequency with which the sorbent must be restored by either reactivating the sorbent or replacing it that drives using a lower temperature swing. A smaller temperature swing would reduce the need to reactivate or replace the sorbent, but requires larger, and thus costlier, reactors, or more frequent cycling of the reactors, which reduces the length of time between overhauls.

Figure 9:
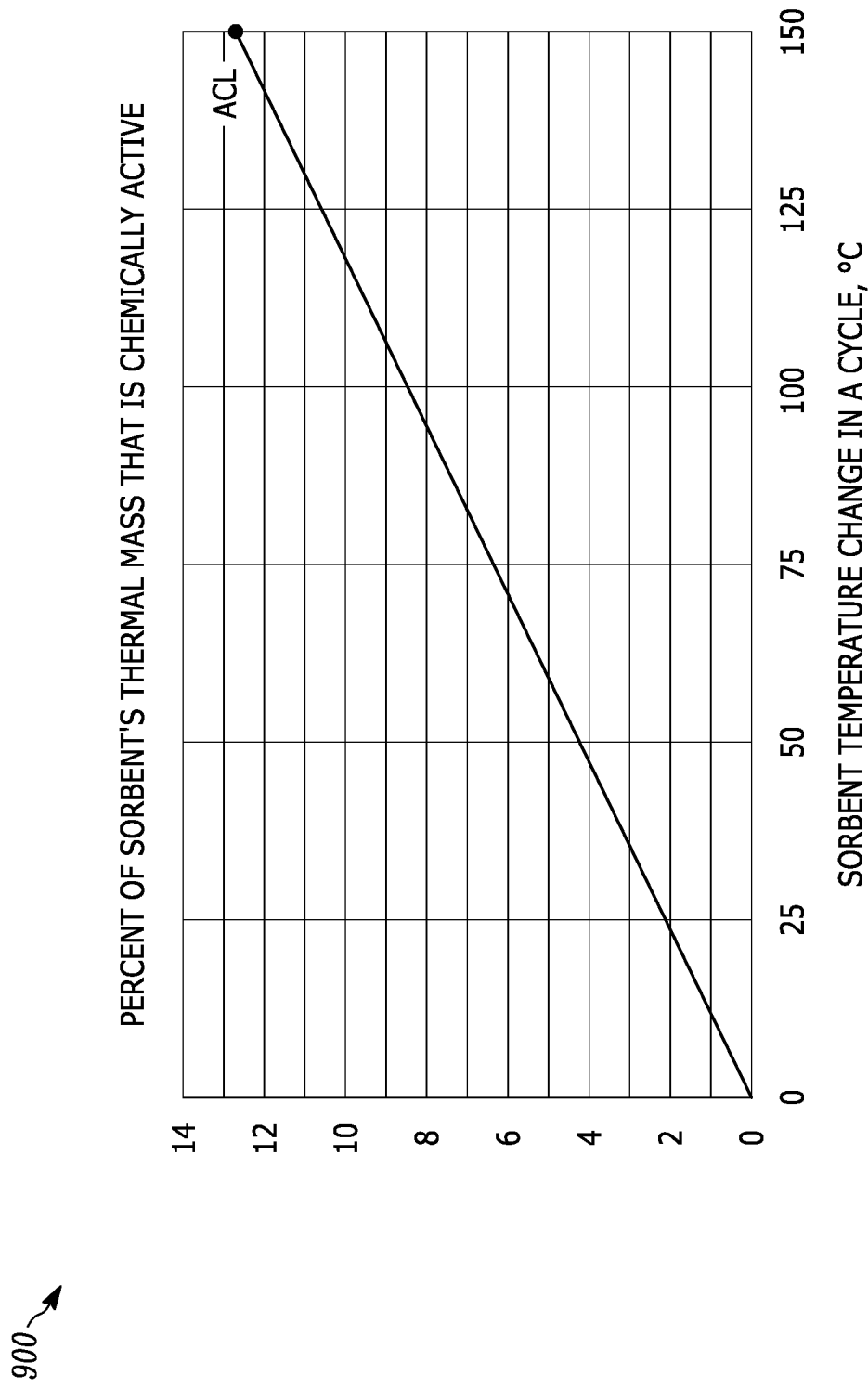
FIG. 9 illustrates a graph representing the reactivity of the sorbent as a function of temperature change of the sorbent during the carbon capture cycle in an embodiment of an adiabatic calcium looping method of the present teaching.

To achieve the 150° C. temperature swing, only approximately 12.6% of the thermal mass of the sorbent must be chemically active. FIG. 9 illustrates a graph 900 representing the reactivity of the sorbent as a function of temperature change of the sorbent during the carbon capture cycle in an embodiment of an adiabatic calcium looping method of the present teaching. The portion of the sorbent that has been made inactive by sintering is factored in the 12.6% of the thermal mass of the sorbent that must be chemically active.

Sorbent produced using an additive such as calcium aluminate can have a reactivity of 35%. Since this is higher than the required 12.6% (see FIG. 9), additional inert material must be added. Some of this may be calcium aluminate that both increases the reactivity of the sorbent and strengthens it. Another additive may be dolomite, whose calcium constituent remains inactive over the operating temperature range of the cycle of the present teaching, thereby providing additional passages to the pores within the sorbent to retain its reactivity. Additionally, fibers of high-temperature materials, such as silicon carbide or metallic superalloys, may be mixed into the sorbent to further strengthen it.

One skilled in the art will appreciate that various combinations of minerals and compositions can be used to provide a combination of long-term stability and reactivity of the sorbent. In addition to sintering, the sorbent is affected by thermal stress, particularly from hydration, that is used in some embodiments to reactivate the sorbent. Another source of stress is the thermal cycling that occurs during operation. The thermal stress may be sufficient to form cracks in the sorbent, which adds to operating costs by requiring replacement when the cracks spread sufficiently to block the flow of gases through the sorbent bed. These thermal stress issues are reduced by using a lower temperature swing of the present teaching. In some embodiments, the temperature swing is 150° C.

Figure 10:
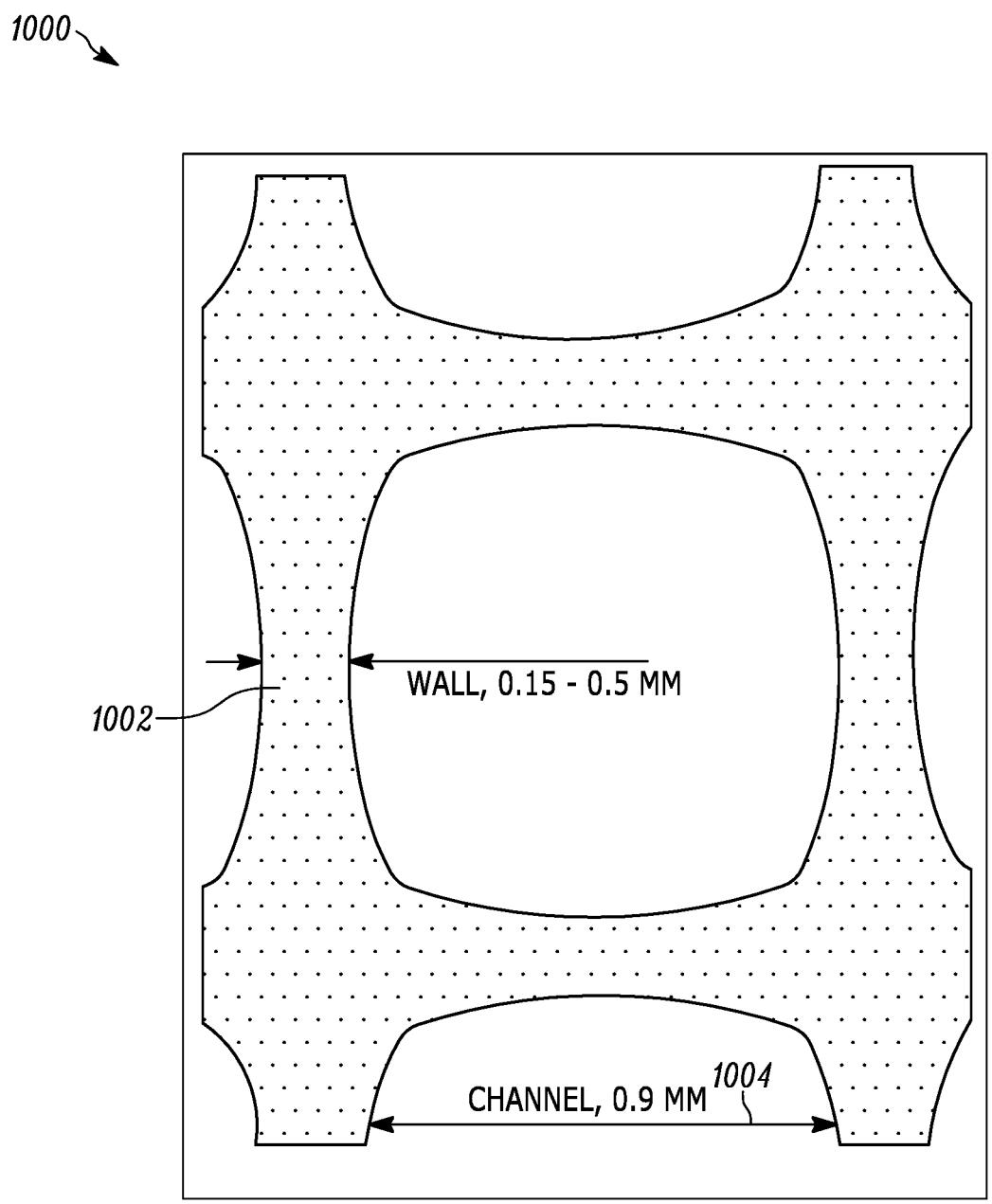
FIG. 10 illustrates a schematic of the cross-section of an embodiment of a honeycomb monolith of an adiabatic calcium looping apparatus of the present teaching.

On feature of the present teaching is that the solid sorbents may be formed in various shapes. In some embodiments, the sorbent is formed into honeycomb monoliths. FIG. 10 illustrates a schematic 1000 of the cross-section of an embodiment of a honeycomb monolith of an adiabatic calcium looping apparatus of the present teaching. The honeycomb monolith comprises a wall 1002 of between 0.15 mm and 0.5 mm thickness. The honeycomb monolith comprises a channel 1004. In some embodiments the channel is 0.9 mm wide.

Figure 11:
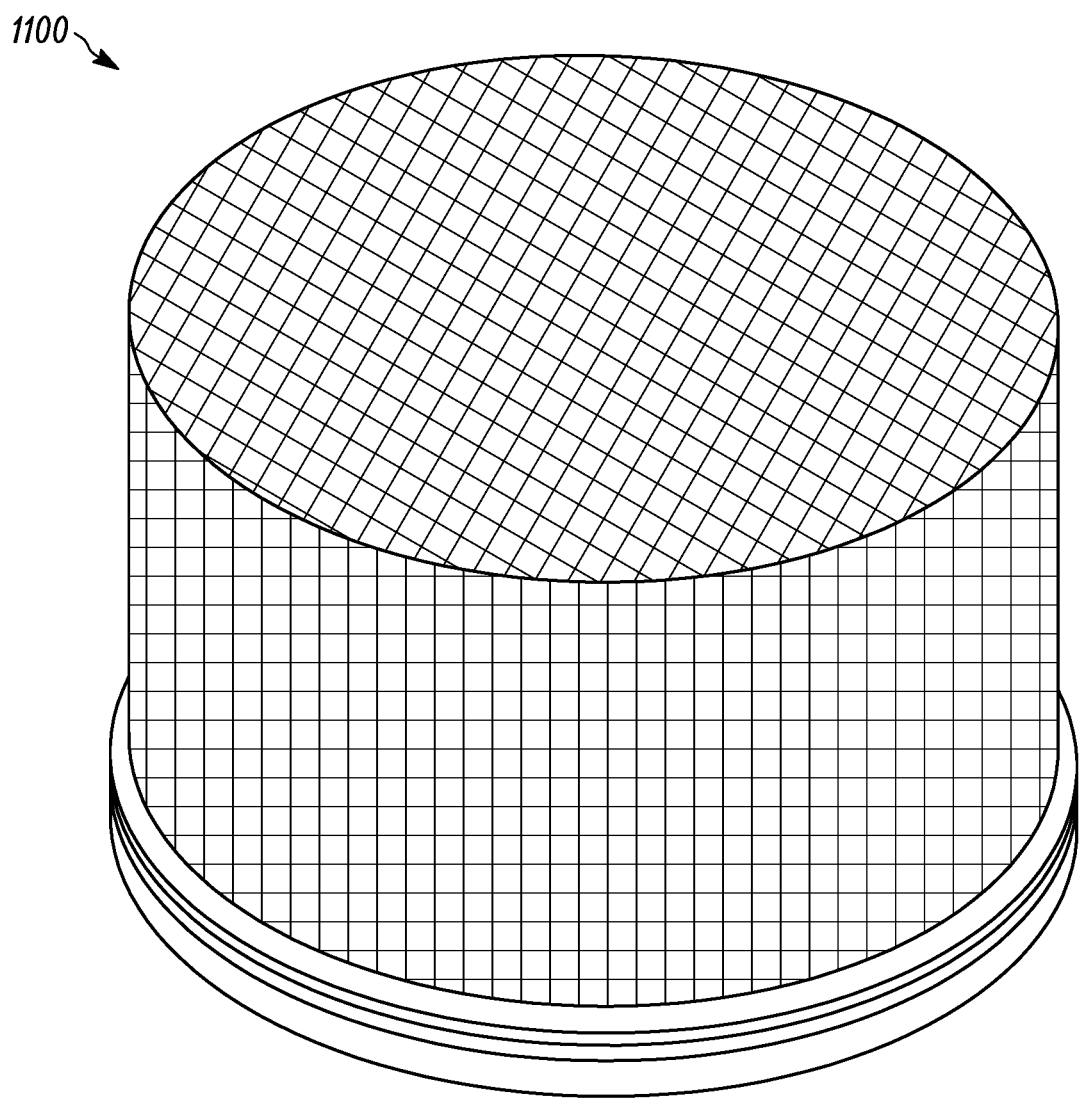
FIG. 11 illustrates a schematic of an embodiment of a bed of honeycomb monolith bricks of an adiabatic calcium looping apparatus of the present teaching.
Figure 12:
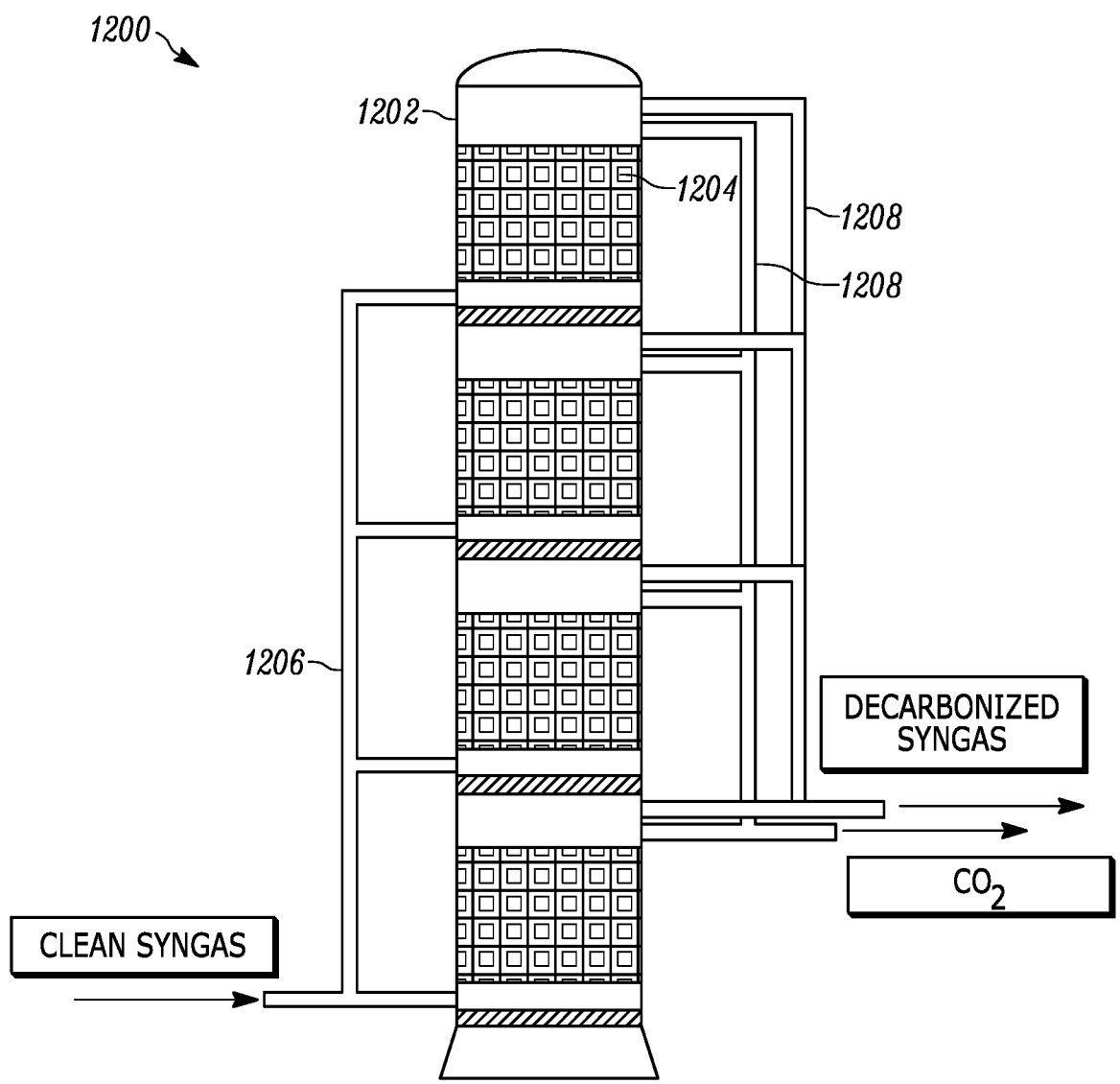
FIG. 12 illustrates a schematic of an embodiment of a pressure vessel containing sorbent beds in parallel of an adiabatic calcium looping apparatus of the present teaching.

The functions of each pressure vessel reactor are periodically and simultaneously reversed by changing the valve positions at the entrance and exit of each pressure vessel reactor. The valve positions are reversed when the sorbent in the carbonator approaches saturation by $CO_2$. To limit the pressure drop through the reactors whose diameters are small enough to be transported to the site, the beds of sorbent are formed in monolithic bricks. FIG. 11 illustrates a schematic of an embodiment of a bed 1100 of honeycomb monolith bricks of an adiabatic calcium looping apparatus of the present teaching. The honeycombs are stacked into parallel beds, as shown in FIG. 12. The beds are located in sealed sections of a pressure vessel that, together, comprise the carbonator or calciner.

FIG. 12 illustrates a schematic of an embodiment of an adiabatic calcium looping apparatus 1200 comprising a pressure vessel 1202 containing sorbent beds of honeycomb monolithic 1204 placed in parallel. Multiple chambers of the pressure vessel are connected to one side of the sorbent beds to an input valve manifold, and connected proximate to the other side of the sorbent beds to an output valve manifold 1208. The input valve manifold 1206 connects to clean syngas supply, and the output valve manifold 1208 connects to outputs that provide decarbonized syngas and $CO_2$. Each cell in the pressure vessel 1202 includes a floor plate sealed to the pressure vessel casing, an inlet plenum, a distributor plate, sorbent beds, and an outlet plenum.

In some embodiments, honeycomb monoliths are not used. Instead, a bed of individual pebbles can be used as a sorbent. The bed of individual pebbles can be readily installed and replaced, although they have higher pressure drops and a less-even flow than the monoliths. As a result, in embodiments that utilize a bed of individual pebbles, the flow is downward to avoid their entrainment in upwardly flowing systems. In some embodiments, large-diameter pebbles that are sized to be heavy enough to avoid entrainment are used. Embodiments that utilize large-diameter pebbles have much longer reaction times.

Another feature of the present teaching is the ability to achieve a short reaction time. Embodiments that use thin-walled honeycombs have relatively short reaction times. Sorbents below 50-µ thick react in under a second. This is because the reaction is by adsorption and there is molecular interaction between the sorbent and the syngas. Making the honeycombs somewhat thicker than 50-µ thick slows their response time. In some embodiments, the dimensions of a typical honeycomb, are chosen to be thin enough to create reaction times of only a few seconds. A few seconds is more than fast enough to minimize the size and cost of the reactors. Providing passages from the surface to the interior of the sorbent by adding calcium aluminate and dolomite also reduces the reaction time. Lower reaction time advantageously means the pressure vessels can be smaller and lowers costs.

Figure 13:
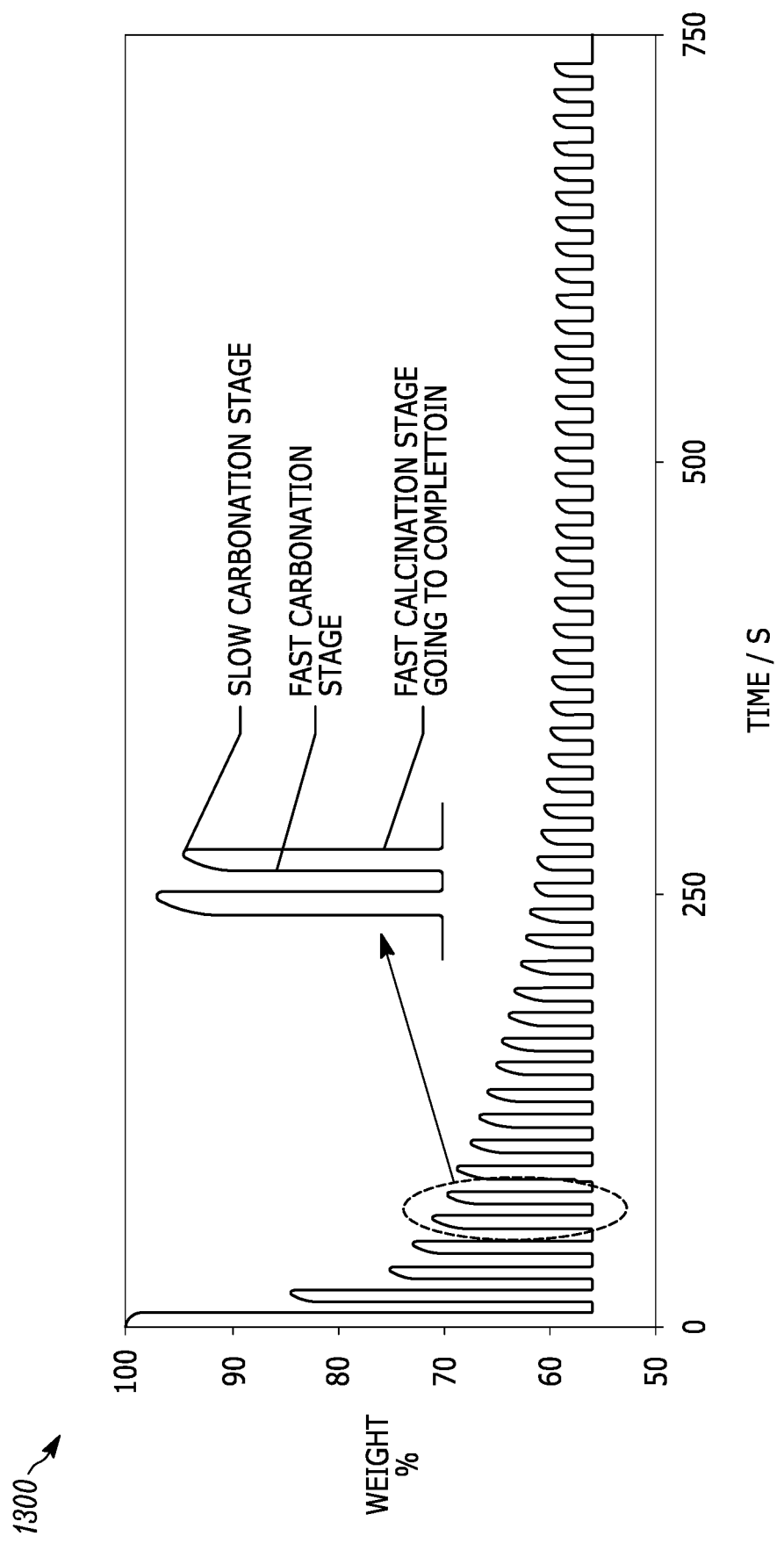
FIG. 13 illustrates a graph representing the response time for the calcination and carbonation of thin-section sorbent in an embodiment of an adiabatic calcium looping method of the present teaching.

FIG. 13 illustrates a graph representing the response time for the calcination and carbonation of thin-section sorbent in an embodiment of an adiabatic calcium looping method of the present teaching. The speed of both carbonation and calcination depend of the particle's thickness. For particles as thin as 150 microns, the speed of reaction is only a second and the time increases only gradually for particles under 400 microns.

Figure 14:
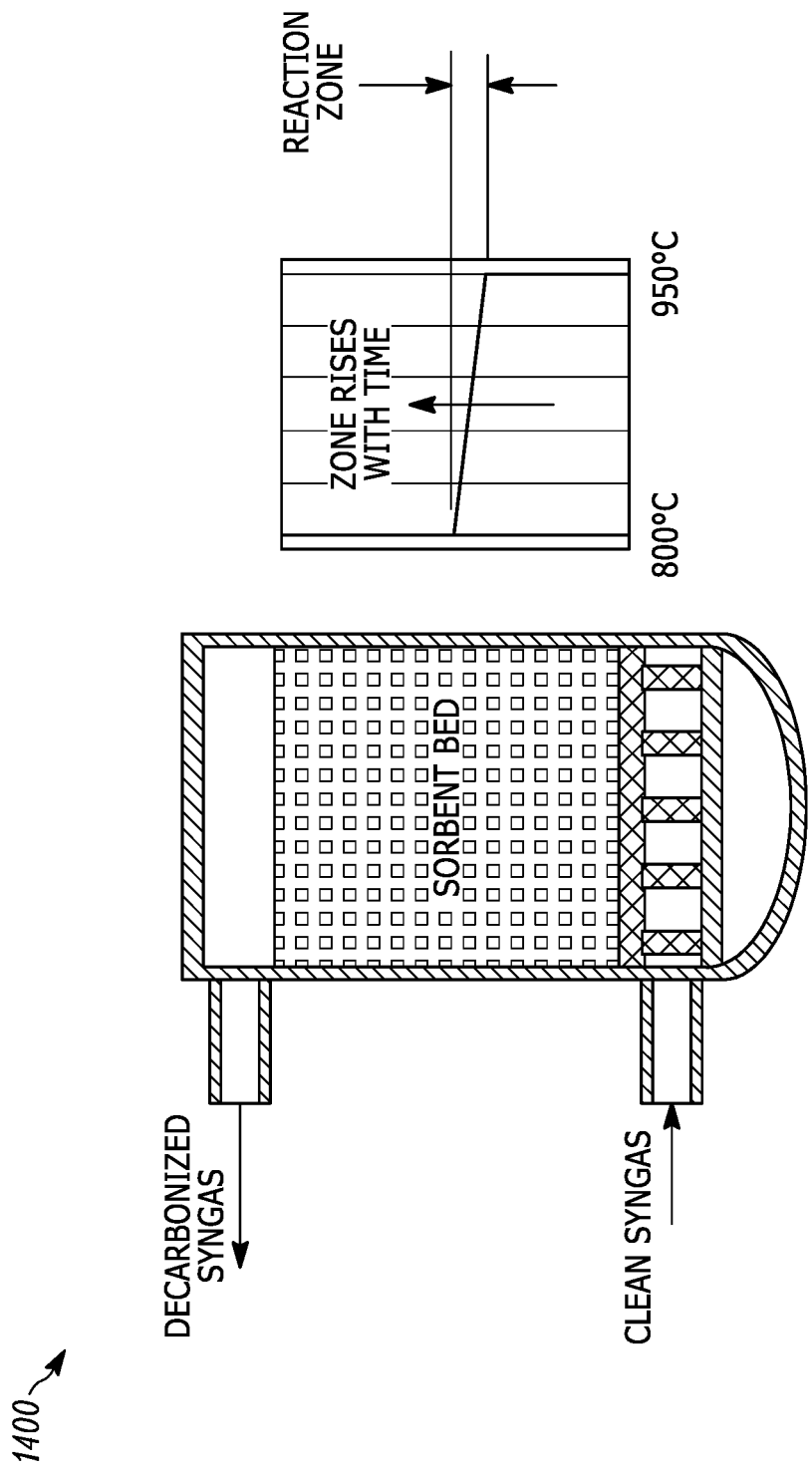
FIG. 14 illustrates a schematic of an embodiment of a temperature wave of the sorbent along a flow path of the sorbent bricks in an embodiment of an adiabatic calcium looping apparatus of the present teaching.

At the start of each cycle, the carbonator has been regenerated, meaning that its reactive material is lime (calcium oxide). When the inlet valve is opened, allowing syngas to enter, the syngas reacts first with the steam added upstream of the carbonator to enable it to undergo the water-gas shift reaction. The $CO_2$ formed is absorbed by the sorbent, reacting with the CaO (lime) there to form $CaCO_3$ (limestone). The reactions occur over a relative short section of sorbent, forming a wave that rises in the sorbent bed as time progresses. FIG. 14 illustrates a schematic 1400 of an embodiment of a temperature wave of the sorbent along a flow path of the sorbent bricks. The gases upstream of the wave are unreacted, while downstream of the wave they are fully decarbonized. Similarly, the temperature of the sorbent upstream of the wave is at the maximum temperature of the cycle, whereas the sorbent temperature downstream is at the minimum temperature.

The length of the reaction zone depends on the reactivity of the sorbent. As such, longer reaction times require larger reactors, which are more costly. Therefore, measures are taken to minimize the reaction time. In the worst case, the height of the reaction zone exceeds the height of the bed, in which case "breakthrough" occurs, whereby some of the syngas passes through the carbonator without having its carbonaceous gases removed.

On the other hand, it is impractical to make the sections of honeycomb too thin, so the use of passage-opening additives, particularly calcium aluminate and dolomite, are used to minimize the resistance of flow to the interiors of the sorbents wall, and reduce the height of the reaction zone.

One feature of the present teaching is that the carbon capture efficiency of the adiabatic calcium looping is very high, over 90%. Referring back to FIG. 4, at the start of calcination, the sorbent is at its upper temperature limit, so the vapor pressure of the $CO_2$ emitted by the sorbent is also at the highest end of its range. Since calcining is endothermic, the release of the $CO_2$ cools the sorbent, thereby reducing its pressure until it is fully regenerated at the left end of the calcining operation. The calciner is then ready to be switched back into the carbonation mode, whereby the flow through the reactor is pressurized syngas and the cycle begins again.

Figure 15:
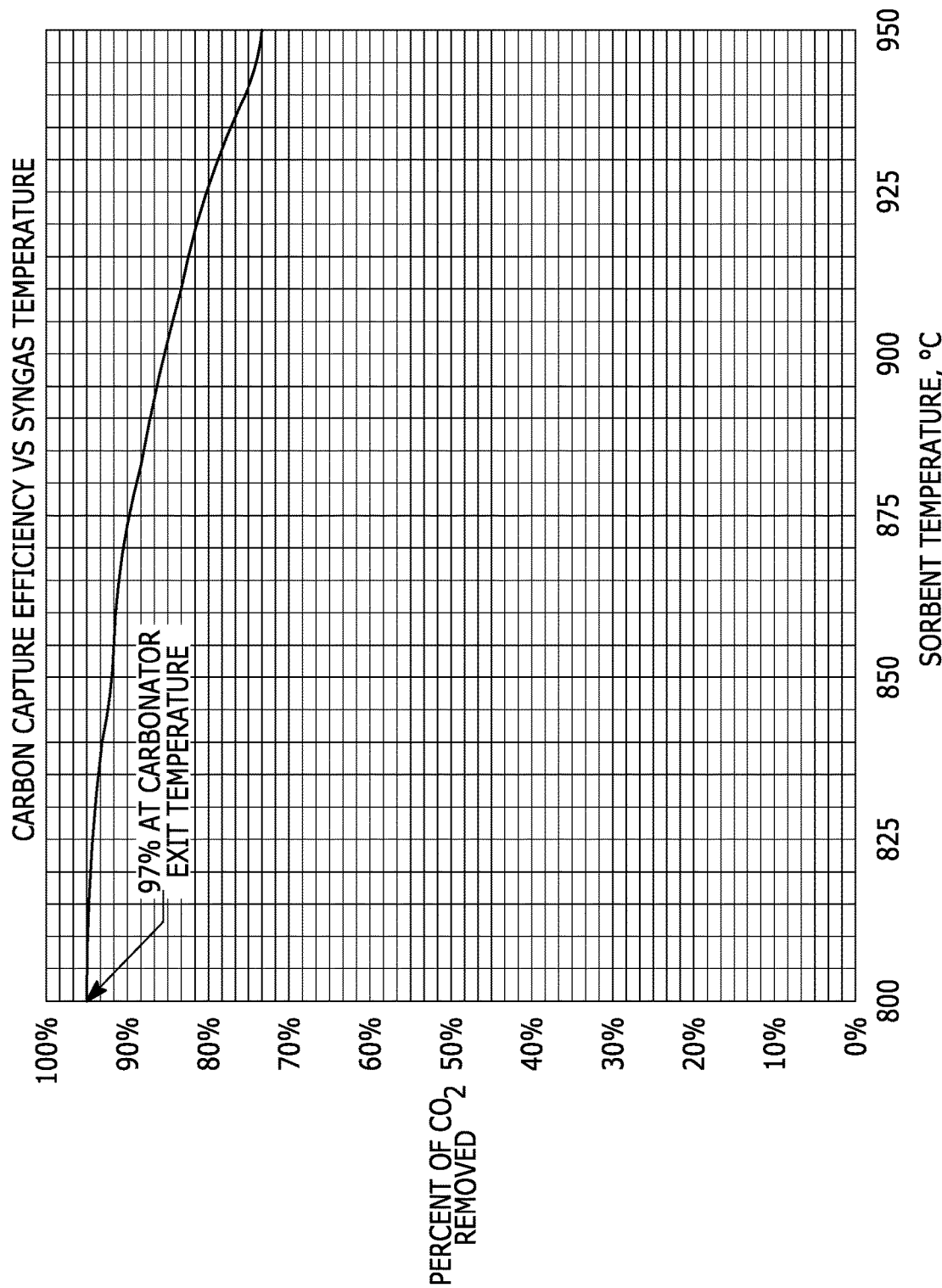
FIG. 15 illustrates a graph representing a comparison of the partial pressure of the $CO_2$ in the syngas to sorbent internal pressure, leading to the 97% carbon capture in an embodiment of an adiabatic calcium looping method of the present teaching.

Referring back to FIG. 5, the partial pressure of $CO_2$ in the pressure vessel drops with the sorbent temperature. The maximum carbon capture efficiency occurs when the partial pressure of $CO_2$ in the syngas drops to this pressure. The partial pressure of $CO_2$ in the syngas depends on the syngas' total pressure multiplied by the concentration of $CO_2$ in the syngas, in accordance with Avagadro's law. FIG. 15 illustrates a graph representing a comparison of the partial pressure of the $CO_2$ in the syngas to sorbent internal pressure over a cycle. FIG. 15 shows that the carbon capture efficiency for some embodiments is 97% when the gasifier pressure for the system operates at 450 psia and the calciner's lowest temperature is 800° C.

The temperature of the sorbent is controlled by the carbonation and calcination reactions, as the reactions occur within the sorbent, itself. The syngas temperature, on the other hand, depends on the inlet temperature of the gas along with how much it is heated in the carbonator by the shift reaction. This is as much as 640° F. in the absence of methane and less if methane is also being reformed, as reforming is endothermic. These reactions occur only in the gaseous phases, which are steam plus CO, or steam plus methane. Consequently, with the exception of some heat transfer from the gases to the monoliths, the reactions affect principally the gas temperatures.

Methane contained in the syngas, which is enhanced by low temperatures and/or high pressures in the gasifier, or emitted from a Coal-to-X reactor (CTX), where X is any material that coal to be changed into, might produce an unacceptable level of $CO_2$ emissions when burned in the gas turbine unless they are first steam-reformed into hydrogen and CO. The CO is then shift-reacted with steam to form hydrogen and $CO_2$, which is then carbonated by the sorbent.

Figure 16:
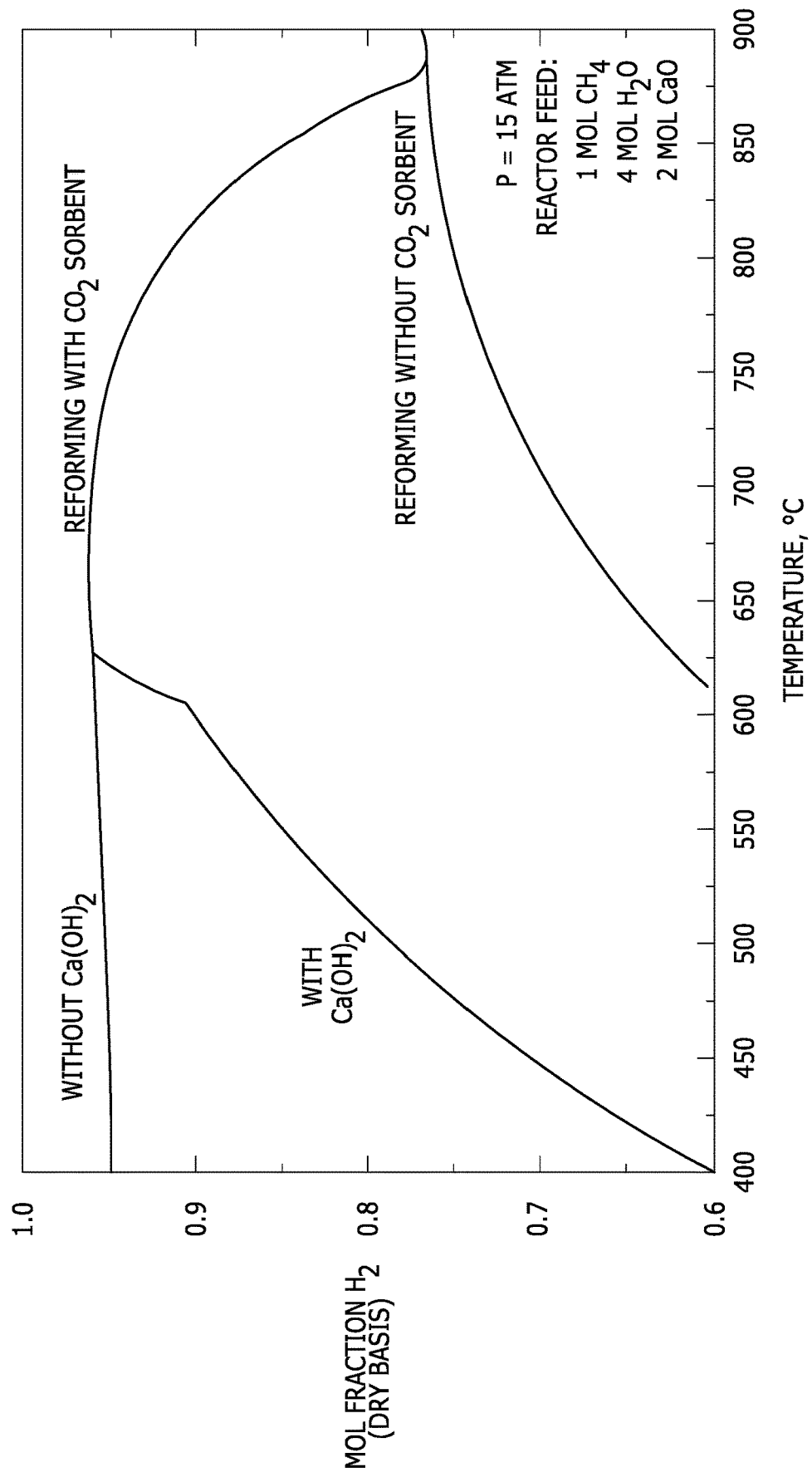
FIG. 16 illustrates a graph representing steam methane reforming with sorbent-enhanced reaction in an embodiment of an adiabatic calcium looping method of the present teaching.

Reforming occurs when the methane is reacted with steam over a nickel catalyst that is coated on some of the sorbent. The coatings are on sorbent near the inlet of the carbonator to enable the methane to be reformed before its CO is then carbonated. Reforming occurs at the same temperatures and in the same vessels as carbonation, and is more efficient than if done in the absence of sorbent. FIG. 16 illustrates a graph representing steam methane reforming with sorbent-enhanced reaction in an embodiment of an adiabatic calcium looping method of the present teaching. One feature of the present teaching is that the processing of a water-gas shift reaction, carbonation reaction, and optionally steam methane reforming occurs in the same pressure vessel as the primary reactions for high-efficiency carbon capture.

In some embodiments, $CO_2$ flow is controlled during calcination using a valve in the outlet of the calciner that maintains the volumetric flow rate at a constant. A second valve in the conduit is used to avoid stalling the compressor during the changeover of pressure vessels, when the flow of $CO_2$ from the calciner is temporarily interrupted. See, for example, valve 356 in FIG. 3.

Flow from the sorbent is proportional to the pressure difference between the interior of the sorbent and the pressure in the flow passages of the honeycombs. If the volumetric flow rate to the compressor is to be kept nearly constant during calcination, the pressure in the calciner will trace the decomposition pressure line (see FIGS. 4 and 5) from just under 28 psia at the start of calcination to 2.5 psia at the end. In some embodiments, the compressor power varies over the regeneration cycle, and is 30% lower than if the compressor inlet were always at the minimal pressure at the end of the cycle.

Changeover describes the conditions when the functions of the reactors are reversed. One problem that must be solved is the continuous flow of fuel to the gas turbine. Another problem to be avoided is the contamination of the gas in each reactor. $CO_2$ from the calciner that contaminates the hydrogen sent to the gas turbine would interrupt combustion, while hydrogen from the carbonator containing $CO_2$ would interfere with the transmission of the $CO_2$ in the pipeline.

Figure 17A:
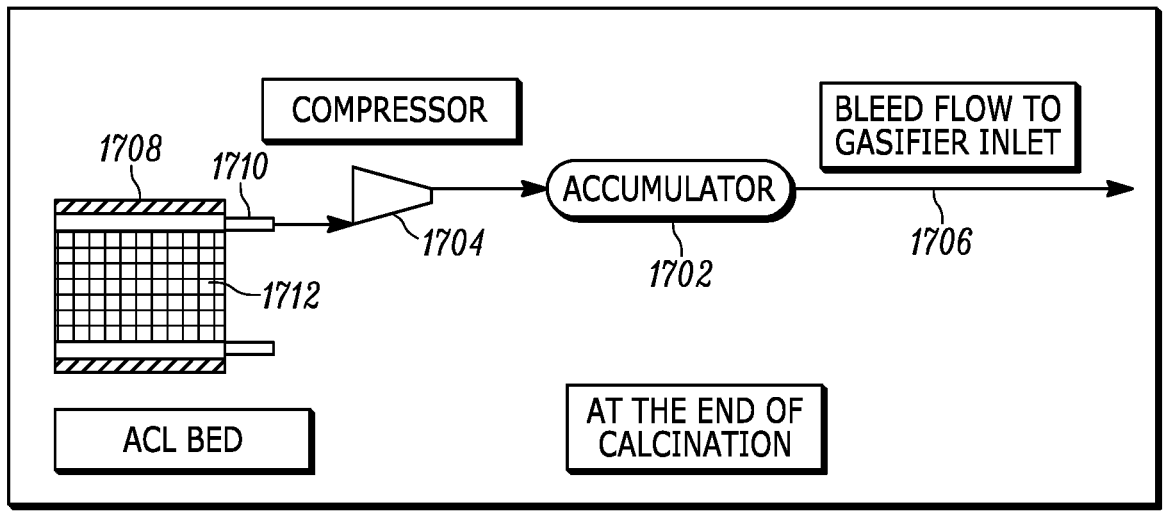
FIG. 17A illustrates a schematic of a simplified flow diagram during reactor normal operation at the end of calcination in an embodiment of an adiabatic calcium looping apparatus of the present teaching.
Figure 17B:
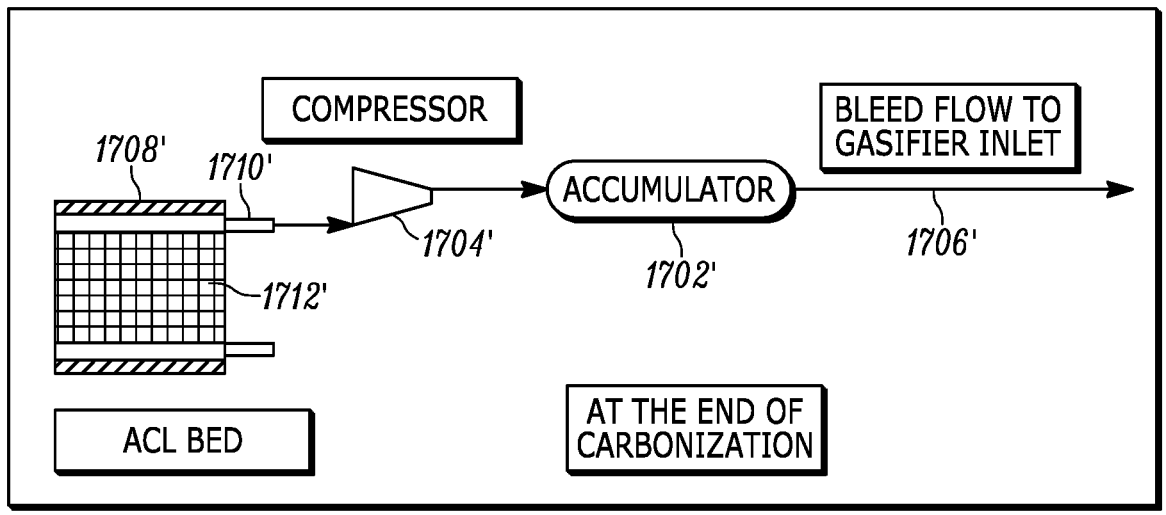
FIG. 17B illustrates a schematic of a simplified flow diagram during reactor normal operation at the end of carbonization in an embodiment of an adiabatic calcium looping apparatus of the present teaching.

To avoid both of these problems, some embodiments of the present teaching utilize pressurized accumulators to provide continuous flow during changeover, while the reactors themselves are flushed by the gases of the upcoming cycle. The contaminated gases are then returned to the gasifier where they are recycled. FIG. 17A illustrates a schematic of a simplified flow diagram 1700 during reactor normal operation at the end of calcination in an embodiment of an adiabatic calcium looping apparatus of the present teaching. An accumulator 1702 is placed between a compressor 1704 and the output 1706 that supplies bleed flow to a gasifier. A pressure vessel 1708 valved output manifold 1710 connects to the compressor 1704. The pressure vessel 1708 includes a sorbent bed 1712. FIG. 17B illustrates a schematic of a simplified flow diagram 1700' during reactor normal operation at the end of carbonization in an embodiment of an adiabatic calcium looping apparatus of the present teaching. The elements of the apparatus are the same in the embodiment of FIG. 17B as the embodiment of FIG. 17A. The valve control on the valved output manifold is different reflecting the particular cycle.

To minimize the flow perturbations during changeovers, the beds of the reactors may be switched individually by valving each section of the pressure vessel independently. Alternatively, the beds may all be changed in unison if sufficiently large accumulators are used to capture the contaminated gases. The flows from the accumulators are then recycled into the outlets of the carbonator and calciner, respectively, over the course of the next cycle.

Figure 18A:
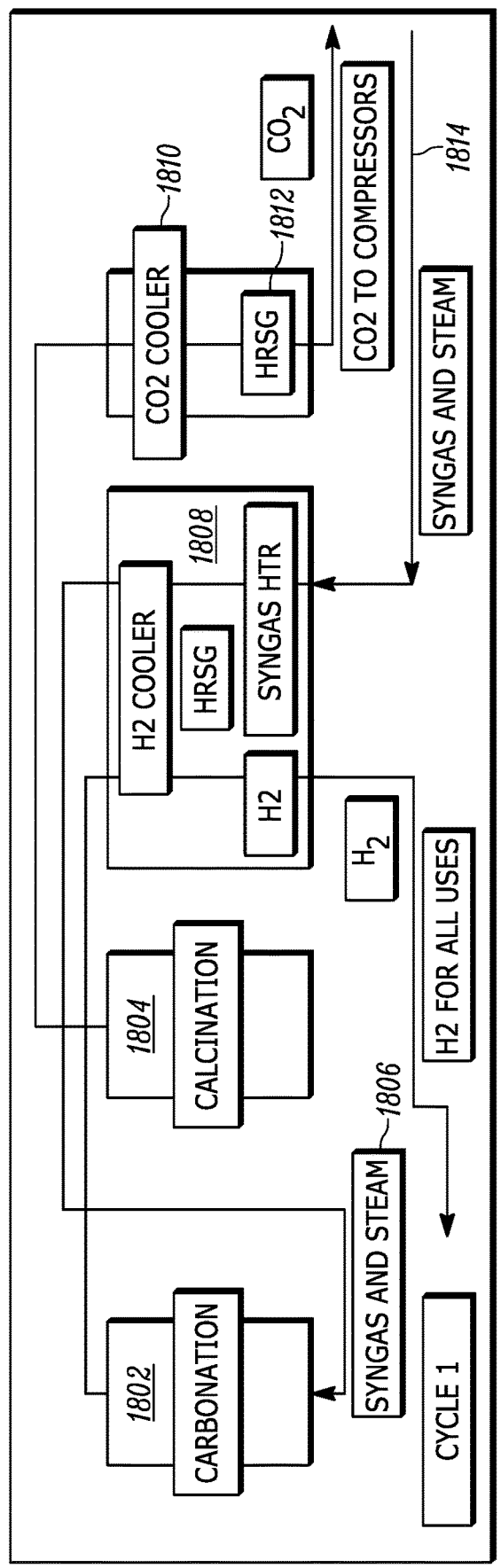
FIG. 18A illustrates a schematic of a simplified flow diagram during one cycle in an embodiment of an adiabatic calcium looping apparatus of the present teaching.
Figure 18B:
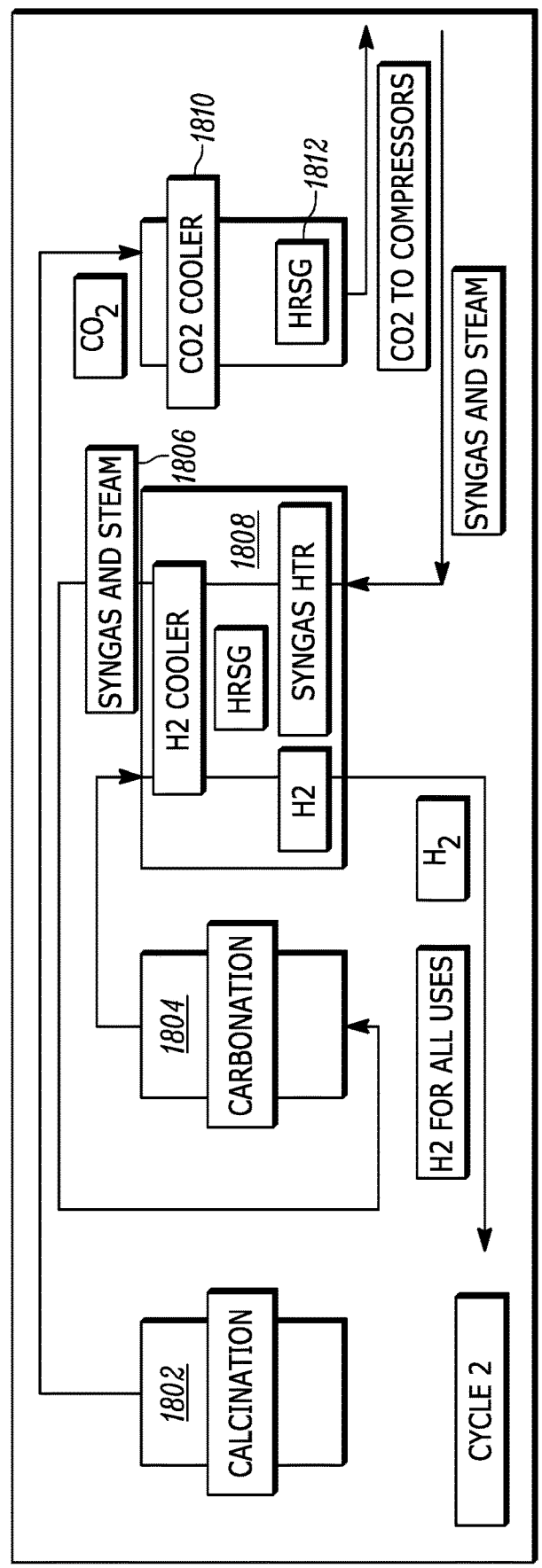
FIG. 18B illustrates a schematic of a simplified flow diagram during another cycle of the embodiment shown in FIG. 18A of an adiabatic calcium looping apparatus of the present teaching.

FIGS. 18A and 18B illustrate schematics of a simplified flow diagram during changeovers in an embodiment of an adiabatic calcium looping apparatus with a heat recovery steam generator (HRSG) of the present teaching. FIG. 18A illustrates a pair of pressure vessels with a first pressure vessel 1802 performing a carbonation process and a second pressure vessel 1804 performing a calciner process. Thus, the first pressure vessel 1802 is receiving syngas and steam 1806 from a HRSG 1808. The first pressure vessel 1802 is providing $H_2$ to the HSRG 1808. The second pressure vessel 1804 is providing $CO_2$ via a $CO_2$ cooler 1810 and HRSG 1812 to compressors (not shown). The syngas and steam 1806 entering the first pressure vessel 1802 is processed through the HRSG 1808 from the input 1814. The $H_2$ provided by the first pressure vessel 1802 passes through the HRSG 1808 before being used for a variety of downstream purposes.

FIG. 18B illustrates the same pair of pressure vessels of FIG. 18A. However, in the cycle illustrated in FIG. 18B, the first pressure vessel 1802 is performing a calcination process and the second pressure vessel 1804 is performing a carbonation process. Thus, the first pressure vessel 1802 is providing $CO_2$ via a $CO_2$ cooler 1810 and HRSG 1812 to compressors (not shown). The second pressure vessel 1804 is receiving syngas and steam 1806 from a HRSG 1808. The second pressure vessel 1804 is providing $H_2$ to the HSRG 1808. The syngas and steam 1806 entering the second pressure vessel 1804 is processed through the HRSG 1808. The $H_2$ provided by the second pressure vessel 1804 passes through the HRSG 1808 before being used for a variety of downstream purposes. Input and output valve manifolds (not shown) connected to the pair of pressure vessels 1802, 1804, are configured by the valve controller to configure valves (not shown) that control the connections between the pressure vessels 1802, 1804 and HRSG 1808, $CO_2$ cooler 1810, and HRSG 1812 to support the flow diagrams for the two cycles of operation illustrated in FIGS. 18A and 18B.

Heat recovery from the adiabatic calcium looping functions, including the water shift reaction, provides a significant improvement in the process efficiency. FIGS. 18A and 18B show that the heat recovery system can be used for each cycle. Additional HRSGs can be used to control potential over heating of the syngas in the carbonator.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A system for decarbonizing gases using pressure swing and a pair of fixed bed, alternating, pressurized reactors, the system comprising:
   a) an input gas manifold comprising a plurality of valves and having at least one input that receives syngas and steam;
   b) a pair of pressure vessels comprising a first and second pressure vessel, each of the first and second pressure vessel comprising:
      i) a fixed bed of sorbent comprising lime, limestone, calcium aluminate, and dolomite that forms a honeycomb monolith having a wall thickness thin enough to create an adsorption reaction time under one second, the calcium aluminate and dolomite being non-reactive components that reduce the reaction time by increasing permeability of the fixed bed sorbent at high temperature;
      ii) a sensor that monitors for saturation of carbon dioxide;
      iii) an input that is coupled to an output of the input gas manifold; and
      iv) an output;
   c) an output gas manifold comprising a plurality of valves and having a first input that is coupled to the output of the first pressure vessel and a second input that is coupled to the output of the second pressure vessel; and
   d) a valve controller having at least one output that is coupled to the input gas manifold and at least one output that is coupled to the output gas manifold, the valve controller controlling the plurality of valves in each of the input and output gas manifolds so that when the sensor that monitors for saturation of carbon dioxide determines that the fixed bed sorbent comprising the honeycomb monolith in one of the first or second pressure vessels is saturated by carbon dioxide, at least one valve controlling one of the first or second pressure vessels for calciner operation and at least one valve controlling the other of the first or second pressure vessel for carbonator operation such that a reaction wave moves in the fixed bed of sorbent comprising the honeycomb monolith in the other of the first or second pressure vessel and decarbonized syngas is expelled.

2. The system for decarbonizing gases of claim 1 wherein the fixed bed of sorbent comprising the honeycomb monolith in at least one of the first and second pressure vessel processes a sorbent-enhanced water-gas shift reaction.

3. The system for decarbonizing gases of claim 2 wherein the fixed bed of sorbent comprising the honeycomb monolith in at least one of the first and second pressure vessel processes steam methane reforming.

4. The system for decarbonizing gases of claim 1 wherein the fixed bed of sorbent comprising the honeycomb monolith comprises a mixture of calcium oxide and a chemically inactive ingredient.

5. The system for decarbonizing gases of claim 4 wherein a quantity of the chemically inactive ingredient is chosen to maintain the fixed bed of sorbent comprising the honeycomb monolith at a predetermined temperature.

6. The system for decarbonizing gases of claim 4 wherein the fixed bed of sorbent comprising the honeycomb monolith comprises additives that achieve predetermined reactivity.

7. The system for decarbonizing gases of claim 1 wherein the fixed bed of sorbent comprising the honeycomb monolith comprises a mixture of calcium aluminate and chemically inactive ingredients that strengthens the honeycomb.

8. The system for decarbonizing gases of claim 1 wherein the fixed bed of sorbent comprising the honeycomb monolith comprises fibers to enhance strength.

9. The system for decarbonizing gases of claim 1 wherein the at least one input of the input gas manifold is coupled to an output of a syngas clean-up system.

10. The system for decarbonizing gases of claim 1 further comprising a heat recovery steam generator having an output that is coupled to the input of the compressor.

11. The system for decarbonizing gases of claim 1 wherein the first and second pressure vessel further comprise a heater that controls a temperature of the fixed bed of sorbent in the first and second pressure vessels to a temperature at which it decarbonizes the carbonaceous gases.

12. The system for decarbonizing gases of claim 11 wherein the heater controls the temperature of the fixed bed of sorbent in the first and second pressure vessels to a temperature that optimizes decarbonization.

13. The system for decarbonizing gases of claim 11 wherein the heater controls the temperature of the fixed bed of sorbent in the first and second pressure vessels to a temperature that optimizes sintering of the fixed bed sorbent comprising the honeycomb monolith.

14. The system for decarbonizing gases of claim 1 wherein the honeycomb monolith comprises at least one wall of between 0.15 mm and 0.5 mm thickness.

15. The system for decarbonizing gases of claim 1 wherein the honeycomb monolith comprises at least one wall less than 50 microns thick.

16. The system for decarbonizing gases of claim 1 wherein the honeycomb monolith comprises at least one channel.

17. The system for decarbonizing gases of claim 16 wherein the channel is 0.9 mm wide.

18. The system for decarbonizing gases of claim 1 wherein fixed bed sorbent comprises a plurality of honeycomb monoliths.

19. The system for decarbonizing gases of claim 18 wherein the plurality of honeycomb monoliths are stacked into parallel beds.

20. The system for decarbonizing gases of claim 19 wherein the parallel beds are located in sealed sections of at least one of the first and second pressure vessels.

21. The system for decarbonizing gases of claim 1 wherein the honeycomb monolith comprises at least one wall less than 400 microns thick.

22. The system for decarbonizing gases of claim 2 wherein the steam methane reforming uses a catalyst.

23. A method for decarbonizing gases using pressure swing in a first and second pressure vessel that each comprise a fixed bed sorbent comprising a honeycomb monolith, the method comprising:

a) providing a fixed bed sorbent having a wall thickness thin enough to create an adsorption reaction time under one second to each of the first and second pressure vessel;

b) increasing the permeability of the fixed bed sorbent at high temperature by providing calcium aluminate and dolomite in each of the first and second pressure vessel, the calcium aluminate and dolomite providing passages to an interior of the fixed bed sorbent;

c) receiving syngas and steam in the first pressure vessel;

d) performing a water-gas shift reaction in the first pressure vessel that reacts carbonaceous species in the received syngas with the received steam to produce carbon dioxide that forms a wave that moves through the fixed bed sorbent comprising the honeycomb monolith;

e) performing a combined water gas shift and carbonation reaction in the first pressure vessel that forms the wave that moves through the fixed bed sorbent;

f) exhausting decarbonated syngas from the first pressure vessel;

g) performing a calcination reaction in the second pressure vessel to release carbon dioxide;

h) providing a vacuum to the second pressure vessel that causes carbon dioxide to exhaust from the second pressurized vessel at a pressure that is below a decomposition pressure line; and i) performing pressure switching of reactions in the first and second pressure vessel when substantially all of the fixed bed sorbent in the first pressure vessel nears saturation using a valve controller and sensor.

24. The method of claim 23 wherein the carbonation reaction in the first pressure vessel further comprises performing a steam methane reforming reaction in at least one of the first and second pressure vessel.

25. The method of claim 23 wherein the receiving syngas comprises receiving syngas from a syngas clean-up system that removes pollutants.

26. The method of claim 23 wherein the carbonaceous species comprises carbon monoxide.

27. The method of claim 23 wherein the carbonaceous species comprises carbon dioxide.

28. The method of claim 23 wherein the carbonaceous species comprises methane.

29. The method of claim 23 wherein the carbonaceous species comprises carbon monoxide and methane.

30. The method of claim 23 further comprising converting methane into carbon dioxide and hydrogen.

* * * * *